US012610409B2

(12) United States Patent
Zhang et al.

(10) Patent No.: US 12,610,409 B2
(45) Date of Patent: Apr. 21, 2026

(54) METHODS, APPARATUSES AND COMPUTER-READABLE MEDIUM FOR DEVICE-TO-DEVICE COMMUNICATION

(71) Applicant: Telefonaktiebolaget LM Ericsson (publ), Stockholm (SE)

(72) Inventors: Zhang Zhang, Beijing (CN); Congchi Zhang, Aachen (DE); Antonino Orsino, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 682 days.

(21) Appl. No.: 17/914,057

(22) PCT Filed: Mar. 23, 2021

(86) PCT No.: PCT/CN2021/082403
§ 371 (c)(1),
(2) Date: Sep. 23, 2022

(87) PCT Pub. No.: WO2021/190504
PCT Pub. Date: Sep. 30, 2021

(65) Prior Publication Data
US 2023/0337299 A1 Oct. 19, 2023

(30) Foreign Application Priority Data

Mar. 25, 2020 (WO) ................ PCT/CN2020/081149

(51) Int. Cl.
*H04W 76/14* (2018.01)
*H04L 45/00* (2022.01)

(52) U.S. Cl.
CPC ............. *H04W 76/14* (2018.02); *H04L 45/66* (2013.01)

(58) Field of Classification Search
CPC ....... H04W 76/14; H04W 4/40; H04W 88/04; H04L 45/66
See application file for complete search history.

(56) References Cited

U.S. PATENT DOCUMENTS

| | | | | |
|---|---|---|---|---|
| 6,683,885 B1 * | 1/2004 | Sugai | .................... | H04L 49/309 |
| | | | | 370/389 |
| 7,167,474 B2 * | 1/2007 | Sugai | ..................... | H04L 45/00 |
| | | | | 370/428 |

(Continued)

FOREIGN PATENT DOCUMENTS

| | | | | |
|---|---|---|---|---|
| CA | 2865207 A1 * | 9/2013 | ............ | H04W 84/18 |
| CN | 1549539 A * | 11/2004 | ............. | H04L 69/24 |

(Continued)

OTHER PUBLICATIONS

Author Unknown, "Technical Specification Group Services and System Aspects; Architecture enhancements for 5G System (5GS) to support Vehicle-to-Everything (V2X) services (Release 16)," Technical Specification 23.287, Version 2.0.0, Aug. 2019, 3GPP Organizational Partners, 50 pages.

(Continued)

*Primary Examiner* — Michael A Keller
(74) *Attorney, Agent, or Firm* — Withrow & Terranova, PLLC

(57) ABSTRACT

Various embodiments of the present disclosure provide a method for direct device-to-device communication. The method which may be performed by a first terminal device comprises receiving a message for connection establishment from a second terminal device. The message includes capability information about relaying for direct device-to-device communication. The method further comprises determining whether to transmit the message to a third terminal device, based at least in part on the capability information. According to various embodiments of the present disclosure, the (Continued)

relaying for direct device-to-device communication, e.g., layer-2/layer-3 based relaying, may be configured and/or enabled efficiently and flexibly.

20 Claims, 13 Drawing Sheets

(56)                      References Cited

U.S. PATENT DOCUMENTS

| | | | | | |
|---|---|---|---|---|---|
| 9,225,540 | B2 * | 12/2015 | Jung | | H04L 12/2814 |
| 9,345,055 | B2 * | 5/2016 | Cho | | H04W 76/14 |
| 9,603,175 | B2 * | 3/2017 | Baek | | H04W 36/033 |
| 10,194,459 | B2 * | 1/2019 | Kim | | H04W 72/21 |
| 10,212,642 | B2 * | 2/2019 | Li | | H04W 40/22 |
| 10,667,314 | B2 * | 5/2020 | Lee | | H04W 76/15 |
| 10,700,764 | B2 * | 6/2020 | Rakotoharison | | H04W 12/06 |
| 11,239,898 | B1 * | 2/2022 | Chandra | | H04W 40/22 |
| 11,758,377 | B2 * | 9/2023 | Lee | | G05D 1/0022 |
| | | | | | 701/2 |
| 12,396,062 | B2 * | 8/2025 | Wang | | H04W 76/14 |
| 2008/0219203 | A1 * | 9/2008 | Chou | | H04W 16/26 |
| | | | | | 370/315 |
| 2014/0160930 | A1 * | 6/2014 | Kwon | | H04L 1/188 |
| | | | | | 370/235 |
| 2015/0009915 | A1 * | 1/2015 | Baek | | H04W 36/033 |
| | | | | | 370/329 |
| 2016/0044726 | A1 * | 2/2016 | Enomoto | | H04W 48/08 |
| | | | | | 370/329 |
| 2016/0381620 | A1 * | 12/2016 | Panaitopol | | H04W 40/02 |
| | | | | | 370/315 |
| 2017/0245245 | A1 * | 8/2017 | Kim | | H04W 72/21 |
| 2018/0014319 | A1 * | 1/2018 | Sukegawa | | H04B 7/15528 |
| 2018/0035276 | A1 * | 2/2018 | Kang | | H04W 72/02 |
| 2018/0288822 | A1 * | 10/2018 | Lee | | H04W 52/0209 |
| 2020/0229045 | A1 * | 7/2020 | Liu | | H04W 48/18 |
| 2021/0160956 | A1 * | 5/2021 | Wang | | H04W 24/10 |
| 2022/0346162 | A1 * | 10/2022 | Van Phan | | H04W 40/22 |
| 2023/0103347 | A1 * | 4/2023 | Kalhan | | H04B 7/15528 |
| | | | | | 455/7 |
| 2023/0224993 | A1 * | 7/2023 | Chang | | H04L 69/24 |
| | | | | | 370/329 |
| 2023/0232201 | A1 * | 7/2023 | Miao | | H04L 5/0053 |
| | | | | | 370/329 |
| 2023/0284007 | A1 * | 9/2023 | Zhang | | H04W 8/24 |
| | | | | | 455/435.1 |
| 2023/0362996 | A1 * | 11/2023 | Cao | | H04B 7/15528 |
| 2023/0370948 | A1 * | 11/2023 | Wang | | H04W 40/36 |
| 2024/0040369 | A1 * | 2/2024 | Lu | | H04W 8/26 |
| 2024/0057014 | A1 * | 2/2024 | Stark | | H04L 67/52 |
| 2024/0205768 | A1 * | 6/2024 | Cheng | | H04W 72/25 |
| 2025/0261006 | A1 * | 8/2025 | Lu | | H04W 76/34 |

FOREIGN PATENT DOCUMENTS

| | | | | | |
|---|---|---|---|---|---|
| CN | 101827449 | A | * | 9/2010 | |
| CN | 102469579 | A | * | 5/2012 | |
| CN | 104821904 | A | * | 8/2015 | H04L 69/167 |
| CN | 104821905 | A | * | 8/2015 | H04L 61/5007 |
| CN | 107005443 | A | * | 8/2017 | H04L 12/66 |
| CN | 107926072 | A | * | 4/2018 | H04W 76/10 |
| CN | 104821904 | B | * | 5/2018 | H04L 69/167 |
| CN | 108809897 | A | * | 11/2018 | H04W 40/12 |
| CN | 109804708 | A | * | 5/2019 | H04W 80/08 |
| CN | 106921543 | B | * | 4/2020 | H04L 12/2803 |
| CN | 108024295 | B | * | 4/2022 | H04W 36/00 |
| CN | 117426111 | A | * | 1/2024 | H04W 4/40 |
| CN | 118714625 | A | * | 9/2024 | H04W 48/10 |
| CN | 118715820 | A | * | 9/2024 | H04W 76/11 |
| EP | 2180741 | A1 | * | 4/2010 | H04B 7/2606 |
| EP | 2978278 | A1 | * | 1/2016 | H04W 4/02 |
| EP | 2981110 | A1 | * | 2/2016 | H04W 76/14 |
| EP | 2981111 | A1 | * | 2/2016 | H04W 8/005 |
| EP | 2983444 | A1 | * | 2/2016 | H04M 3/42 |
| EP | 3010188 | A1 | * | 4/2016 | H04L 12/4633 |
| EP | 3618391 | A1 | * | 3/2020 | H04L 67/51 |
| EP | 4050939 | A1 | * | 8/2022 | H04W 40/22 |
| EP | 4171124 | A1 | * | 4/2023 | H04W 36/033 |
| EP | 4181542 | A1 | * | 5/2023 | H04W 4/021 |
| EP | 4073955 | B1 | * | 10/2024 | H04W 74/0833 |
| JP | 2006019808 | A | * | 1/2006 | H04W 72/569 |
| JP | 2010050520 | A | * | 3/2010 | H04B 7/155 |
| JP | 2011135594 | A | * | 7/2011 | |
| JP | 2018038012 | A | * | 3/2018 | |
| JP | 2019134197 | A | * | 8/2019 | H04W 48/18 |
| JP | 6623957 | B2 | * | 12/2019 | H04W 24/04 |
| JP | 2020014176 | A | * | 1/2020 | |
| JP | 7554919 | B2 | * | 9/2024 | H04W 48/14 |
| JP | 7673205 | B2 | * | 5/2025 | H04W 76/14 |
| KR | 20070037856 | A | * | 4/2007 | H04W 28/24 |
| KR | 20110017088 | A | * | 2/2011 | H04W 88/18 |
| KR | 20120074239 | A | * | 7/2012 | H04B 7/155 |
| KR | 102271876 | B1 | * | 6/2021 | H04W 4/80 |
| KR | 102415672 | B1 | * | 7/2022 | H04W 72/51 |
| RU | 2602338 | C1 | * | 11/2016 | H04W 84/12 |
| WO | WO-2013131234 | A1 | * | 9/2013 | H04W 76/14 |
| WO | WO-2014156967 | A1 | * | 10/2014 | H04B 5/20 |
| WO | WO-2018082644 | A1 | * | 5/2018 | H04W 36/0011 |
| WO | WO-2018196497 | A1 | * | 11/2018 | H04L 69/22 |
| WO | WO-2018228883 | A1 | * | 12/2018 | H04L 67/125 |
| WO | WO-2019209032 | A1 | * | 10/2019 | H04W 40/246 |
| WO | WO-2020258885 | A1 | * | 12/2020 | H04W 24/08 |
| WO | WO-2021138868 | A1 | * | 7/2021 | H04W 40/22 |
| WO | WO-2021190504 | A1 | * | 9/2021 | H04W 88/04 |
| WO | WO-2021227072 | A1 | * | 11/2021 | H04W 24/08 |
| WO | WO-2021254345 | A1 | * | 12/2021 | H04W 36/144 |
| WO | WO-2022029188 | A1 | * | 2/2022 | H04W 76/14 |
| WO | WO-2022083930 | A1 | * | 4/2022 | H04L 63/0414 |
| WO | WO-2022135035 | A1 | * | 6/2022 | H04W 36/03 |
| WO | WO-2022222202 | A1 | * | 10/2022 | H04W 88/04 |
| WO | WO-2023117873 | A1 | * | 6/2023 | H04W 76/11 |
| WO | WO-2023150963 | A1 | * | 8/2023 | H04W 88/04 |
| WO | WO-2025151734 | A1 | * | 7/2025 | H04W 8/00 |

OTHER PUBLICATIONS

International Search Report and Written Opinion for International Patent Application No. PCT/CN2021/082403, mailed Jun. 14, 2021, 18 pages.
Examination Report for European Patent Application No. 21719029.7, mailed May 26, 2025, 9 pages.

* cited by examiner

410

Receive a message for connection establishment from a second terminal device — 412

Determine whether to transmit the message to a third terminal device, based at least in part on the capability information — 414

420

Generate a message for connection establishment — 422

Transmit the message for connection establishment to a first terminal device — 424

500

610

620

630

640

BEGIN

1010
Host computer provides user data

1020
Host computer initiates transmission carrying the user data to the UE

1030
UE receives the user data

END

METHODS, APPARATUSES AND COMPUTER-READABLE MEDIUM FOR DEVICE-TO-DEVICE COMMUNICATION

This application is a 35 U.S.C. § 371 national phase filing of International Application No. PCT/CN2021/082403, filed Mar. 23, 2021, which claims the benefit of International Application No. PCT/CN2020/081149, filed Mar. 25, 2020, the disclosures of which are incorporated herein by reference in their entireties.

FIELD OF THE INVENTION

The present disclosure generally relates to communication networks, and more specifically, to a method and apparatus for device-to-device (D2D) communication.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the evolution of wireless communication, a requirement for supporting D2D communication features in various applications is proposed. An extension for the D2D work may consist of supporting vehicle-to-everything (V2X) communication, which may include any combination of direct communications among vehicles, pedestrians and infrastructure. Wireless communication networks such as long-term evolution (LTE) and new radio (NR) networks may be expected to use V2X services and support communication for V2X capable user equipment (UE).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In a wireless communication network, V2X services may be used by various applications to meet different communication requirements. Direct unicast transmission over a sidelink between two V2X capable UEs (also called V2X UEs for short) may be needed in some applications such as platooning, cooperative driving, dynamic ride sharing, etc. For the case that the network environment is not suitable for two V2X capable UEs to establish single hop sidelink unicast communication, multi-hop sidelink unicast communication may be expected for the two UEs. For example, one or more relay UEs may be used to forward data between a source UE (i.e. a UE initiating the communication) and a target UE (i.e. a destination of the communication). However, some UEs may not support relaying communication, e.g. layer-2 based relaying or other types of relaying. Therefore, it may be desirable to configure and/or enable relaying for communications between UEs efficiently.

Various exemplary embodiments of the present disclosure propose a solution for D2D communication, which can enable capability information about whether relaying for direct D2D communication (e.g., layer-2 based relaying and/or other type(s) of relaying) may be supported by UEs to be conveyed over a multi-hop path, so that the relaying for direct D2D communication may be configured properly and applied flexibly to enhance different transmissions between UEs.

It can be appreciated that the direct D2D communication described in this document may refer to D2D communication via sidelink, or any other types of communication that occurs directly between devices without via infrastructure. In addition, it can be appreciated that the direct D2D communication described in this document may be implemented by adopting relaying (e.g. relaying based on layer-2 or higher layer(s), etc.) for a path between a source device and a target device of the direct D2D communication.

According to a first aspect of the present disclosure, there is provided a method performed by a first terminal device such as a UE. The method comprises receiving a message for connection establishment (e.g., a request for connection establishment, etc.) from a second terminal device. The message may include capability information about relaying for direct D2D communication. The method further comprises determining whether to transmit the message to a third terminal device, based at least in part on the capability information.

In accordance with an exemplary embodiment, the relaying for direct D2D communication may comprise layer-2 based relaying, layer-3 based relaying, and/or other types of relaying (e.g., layer-1 based relaying, etc.).

In accordance with an exemplary embodiment, the layer-2 based relaying may comprise adaptation layer functionality based relaying.

In accordance with an exemplary embodiment, the determination of whether to transmit the message to the third terminal device based at least in part on the capability information may comprise: determining to transmit the message to the third terminal device, when the first terminal device supports layer-2 based relaying, and the capability information indicates that the second terminal device supports the layer-2 based relaying. In this embodiment, the second terminal device may be a source device initiating the connection establishment.

In accordance with an exemplary embodiment, the determination of whether to transmit the message to the third terminal device based at least in part on the capability information may comprise: determining to transmit the message to the third terminal device, when the first terminal device supports another type of relaying different from layer-2 based relaying, and the capability information indicates that the second terminal device supports the another type of relaying. In this embodiment, the second terminal device may be a source device initiating the connection establishment.

In accordance with an exemplary embodiment, the determination of whether to transmit the message to the third terminal device based at least in part on the capability information may comprise: determining not to transmit the message to the third terminal device, when layer-2 based relaying is not supported by the first terminal device, and the capability information indicates that the second terminal device only supports the layer-2 based relaying. In this embodiment, the second terminal device may be a source device initiating the connection establishment.

In accordance with an exemplary embodiment, the determination of whether to transmit the message to the third terminal device based at least in part on the capability information may comprise: determining to transmit the message to the third terminal device, when the first terminal device supports layer-2 based relaying, and the capability information indicates that a source device initiating the connection establishment and each relay device between the source device and the first terminal device support the layer-2 based relaying. In this embodiment, the second terminal device may be a relay device between the source device and the first terminal device.

In accordance with an exemplary embodiment, the determination of whether to transmit the message to the third terminal device based at least in part on the capability information may comprise: determining to transmit the message to the third terminal device, when the first terminal device supports another type of relaying different from layer-2 based relaying, and the capability information indicates that a source device initiating the connection establishment and each relay device between the source device and the first terminal device support the another type of relaying. In this embodiment, the second terminal device may be a relay device between the source device and the first terminal device.

In accordance with an exemplary embodiment, the determination of whether to transmit the message to the third terminal device based at least in part on the capability information may comprise: determining not to transmit the message to the third terminal device, when layer-2 based relaying is not supported by the first terminal device, and the capability information indicates that a source device initiating the connection establishment and each relay device between the source device and the first terminal device only support the layer-2 based relaying. In this embodiment, the second terminal device may be a relay device between the source device and the first terminal device.

In accordance with an exemplary embodiment, the method according to the first aspect of the present disclosure may further comprise: informing one or more other devices of which type of relaying is supported by the first terminal device.

In accordance with an exemplary embodiment, the method according to the first aspect of the present disclosure may further comprise: transmitting a response to the second terminal device to reject the connection establishment, when determining not to transmit the message to the third terminal device.

In accordance with an exemplary embodiment, the method according to the first aspect of the present disclosure may further comprise: updating the capability information included in the message for connection establishment. In an embodiment, the capability information included in the message for connection establishment may be updated according to whether the relaying for direct D2D communication is supported by the first terminal device, and/or which type(s) of relaying may be supported by the first terminal device.

In accordance with an exemplary embodiment, the method according to the first aspect of the present disclosure may further comprise: transmitting the message for connection establishment to the third terminal device, when determining to transmit the message to the third terminal device.

In accordance with an exemplary embodiment, the method according to the first aspect of the present disclosure may further comprise: receiving, from the third terminal device, a confirmation of a target device with respect to the connection establishment. The confirmation may indicate which type of relaying is to be adopted for a path between the source device and the target device.

In accordance with an exemplary embodiment, the method according to the first aspect of the present disclosure may further comprise: transmitting the confirmation with respect to the connection establishment to the second terminal device, in response to the reception of the confirmation from the third terminal device.

In accordance with an exemplary embodiment, the method according to the first aspect of the present disclosure may further comprise: receiving, from the third terminal device, information about whether the third terminal device supports the layer-2 based relaying. In this embodiment, the third terminal device may be the target device of the connection establishment.

In accordance with an exemplary embodiment, the method according to the first aspect of the present disclosure may further comprise: enabling the layer-2 based relaying for the path between the source device and the target device, when the confirmation indicates that the layer-2 based relaying is to be adopted for the path between the source device and the target device.

In accordance with an exemplary embodiment, the layer-2 based relaying may be performed by an adaptation layer entity with one or more adaptation layer functionalities. In an embodiment, the one or more adaptation layer functionalities may be activated for the first terminal device according to one or more of:

an indication of activating an adaptation layer;

a request message for establishing a layer-2 relay path;

an accept message for establishing a layer-2 relay path;

a packet which is to be transmitted over a logical channel (LCH) related to a multi-hop path where the layer-2 based relaying is used;

a packet which is to be transmitted over a sidelink radio bearer (SLRB) related to a multi-hop path where the layer-2 based relaying is used;

an indication of configuring an adaptation layer; and configuration information including one or more parameters for configuring an adaptation layer (e.g., information for SLRB configuration, etc.).

In accordance with an exemplary embodiment, the method according to the first aspect of the present disclosure may further comprise: transmitting a packet including an adaptation layer header to at least one of the second terminal device and the third terminal device, when adaptation layer functionality based relaying is adopted for the path between the source device and the target device.

In accordance with an exemplary embodiment, the method according to the first aspect of the present disclosure may further comprise: receiving a packet including an adaptation layer header from at least one of the second terminal device and the third terminal device, when adaptation layer functionality based relaying is adopted for the path between the source device and the target device.

In accordance with an exemplary embodiment, the adaptation layer header may include one or more of:

a source layer-2 identifier (ID) of the source device;

a destination layer-2 ID of the target device;

an end-to-end SLRB ID; and one or more IDs related to at least part of a packet.

In accordance with an exemplary embodiment, the method according to the first aspect of the present disclosure may further comprise: mapping one or more SLRBs to a sidelink LCH, according to a predetermined criterion.

In accordance with an exemplary embodiment, the predetermined criterion may indicate one or more of:

mapping a SLRB to a sidelink LCH according to a type of the SLRB;

reserving one or more SLRB IDs for sidelink control signaling;

transmitting a traffic in a type of sidelink LCH according to on which type of sidelink LCH the traffic is received;

transmitting a traffic to a SLRB according to on which type of SLRB the traffic is received; and indicating a type of a SLRB.

In accordance with an exemplary embodiment, the method according to the first aspect of the present disclosure may further comprise: indicating whether an adaptation layer header is included in a packet transmitted by the first terminal device.

In accordance with an exemplary embodiment, the method according to the first aspect of the present disclosure may further comprise: multiplexing packets according to whether an adaptation layer header is included in each of the packets.

In accordance with an exemplary embodiment, the method according to the first aspect of the present disclosure may further comprise: multiplexing packets to be transmitted to different layer-2 destinations into one protocol data unit (PDU). In an embodiment, each of the packets may have an associated adaptation layer header.

In accordance with an exemplary embodiment, the different layer-2 destinations may be corresponding to the same device, and the PDU may have a header including information about one of the different layer-2 destinations.

In accordance with an exemplary embodiment, the method according to the first aspect of the present disclosure may further comprise: receiving configuration information about the relaying for direct D2D communication from a network node.

According to a second aspect of the present disclosure, there is provided an apparatus which may be implemented as a first terminal device. The apparatus may comprise one or more processors and one or more memories storing computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a first terminal device. The apparatus may comprise a receiving unit and a determining unit. In accordance with some exemplary embodiments, the receiving unit may be operable to carry out at least the receiving step of the method according to the first aspect of the present disclosure. The determining unit may be operable to carry out at least the determining step of the method according to the first aspect of the present disclosure.

According to a fifth aspect of the present disclosure, there is provided a method performed by a second terminal device such as a UE. The method comprises generating a message for connection establishment, by the second terminal device which may be a source device initiating the connection establishment. The message may include capability information about relaying for direct D2D communication. The method further comprises transmitting the message for connection establishment to a first terminal device which may be a relay device between the source device and a target device of the connection establishment.

In accordance with some exemplary embodiments, the first and second terminal devices described according to the fifth aspect of the present disclosure may correspond to the first and second terminal devices described according to the first aspect of the present disclosure, respectively. To this regard, the message for connection establishment received by the first terminal device according to the first aspect of the present disclosure may be the message for connection establishment transmitted by the second terminal device according to the fifth aspect of the present disclosure.

In accordance with an exemplary embodiment, the method according to the fifth aspect of the present disclosure may further comprise: receiving a response from the first terminal device to reject the connection establishment.

In accordance with an exemplary embodiment, the method according to the fifth aspect of the present disclosure may further comprise: receiving, from the first terminal device, information about which type of relaying is supported by the first terminal device.

In accordance with an exemplary embodiment, the method according to the fifth aspect of the present disclosure may further comprise: receiving, from the first terminal device, a confirmation of the target device with respect to the connection establishment. The confirmation may indicate which type of relaying is to be adopted for a path between the source device and the target device.

In accordance with an exemplary embodiment, the method according to the fifth aspect of the present disclosure may further comprise: enabling layer-2 based relaying for the path between the source device and the target device, when the confirmation indicates that the layer-2 based relaying is to be adopted for the path between the source device and the target device.

In accordance with an exemplary embodiment, the layer-2 based relaying may be performed by an adaptation layer entity with one or more adaptation layer functionalities. The one or more adaptation layer functionalities may be activated for the second terminal device according to one or more of:

an indication of activating an adaptation layer;

a relaying configuration in a multi-hop path;

a request message for establishing a layer-2 relay path;

an accept message for establishing a layer-2 relay path;

a packet which is to be transmitted over an LCH related to a multi-hop path where the layer-2 based relaying is used;

a packet which is to be transmitted over a SLRB related to a multi-hop path where the layer-2 based relaying is used;

an indication of configuring an adaptation layer; and configuration information including one or more parameters for configuring an adaptation layer (e.g., information for SLRB configuration, etc.).

In accordance with an exemplary embodiment, the method according to the fifth aspect of the present disclosure may further comprise: transmitting a packet including an adaptation layer header to the first terminal device, when adaptation layer functionality based relaying is adopted for the path between the source device and the target device.

In accordance with an exemplary embodiment, the method according to the fifth aspect of the present disclosure may further comprise: receiving a packet including an adaptation layer header from the first terminal device, when adaptation layer functionality based relaying is adopted for the path between the source device and the target device.

In accordance with an exemplary embodiment, the method according to the fifth aspect of the present disclosure may further comprise: mapping one or more SLRBs to a sidelink LCH, according to a predetermined criterion (e.g., the predetermined criterion according to the first aspect of the present disclosure).

In accordance with an exemplary embodiment, the method according to the fifth aspect of the present disclosure may further comprise: indicating whether an adaptation layer header is included in a packet transmitted by the second terminal device.

In accordance with an exemplary embodiment, the method according to the fifth aspect of the present disclosure may further comprise: multiplexing packets according to whether an adaptation layer header is included in each of the packets.

In accordance with an exemplary embodiment, the method according to the fifth aspect of the present disclosure may further comprise: multiplexing packets to be transmitted to different layer-2 destinations into a PDU. In an embodiment, each of the packets may have an associated adaptation layer header.

In accordance with an exemplary embodiment, the different layer-2 destinations may be corresponding to the same device, and the PDU may have a header including information about one of the different layer-2 destinations.

In accordance with an exemplary embodiment, the method according to the fifth aspect of the present disclosure may further comprise: receiving configuration information about the relaying for direct D2D communication from a network node.

According to a sixth aspect of the present disclosure, there is provided an apparatus which may be implemented as a second terminal device. The apparatus may comprise one or more processors and one or more memories storing computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a second terminal device. The apparatus may comprise a generating unit and a transmitting unit. In accordance with some exemplary embodiments, the generating unit may be operable to carry out at least the generating step of the method according to the fifth aspect of the present disclosure. The transmitting unit may be operable to carry out at least the transmitting step of the method according to the fifth aspect of the present disclosure.

According to a ninth aspect of the present disclosure, there is provided a method performed by a third terminal device such as a UE. The method comprises receiving a message for connection establishment from a first terminal device which may be a relay device between a source device and a target device of the connection establishment, by the third terminal device which may be the target device of the connection establishment. The message may include capability information about relaying for direct D2D communication. The method further comprises determining whether to accept the connection establishment, based at least in part on the capability information.

In accordance with some exemplary embodiments, the first and third terminal devices described according to the ninth aspect of the present disclosure may correspond to the first and third terminal devices described according to the first aspect of the present disclosure, respectively. To this regard, the message for connection establishment received by the third terminal device according to the ninth aspect of the present disclosure may be the message for connection establishment transmitted by the first terminal device according to the first aspect of the present disclosure.

In accordance with an exemplary embodiment, the determination of whether to accept the connection establishment based at least in part on the capability information may comprise: determining to accept the connection establishment, when the capability information indicates that the source device and each relay device between the source device and the target device support layer-2 based relaying.

In accordance with an exemplary embodiment, the determination of whether to accept the connection establishment based at least in part on the capability information may comprise: determining to accept the connection establishment, when the capability information indicates that the source device and each relay device between the source device and the target device support another type of relaying different from layer-2 based relaying.

In accordance with an exemplary embodiment, the method according to the ninth aspect of the present disclosure may further comprise: transmitting a confirmation with respect to the connection establishment to the first terminal device. The confirmation may indicate which type of relaying is to be adopted for a path between the source device and the target device.

In accordance with an exemplary embodiment, the method according to the ninth aspect of the present disclosure may further comprise: informing the first terminal device of whether the third terminal device supports layer-2 based relaying.

In accordance with an exemplary embodiment, the method according to the ninth aspect of the present disclosure may further comprise: enabling layer-2 based relaying for the path between the source device and the target device, when the confirmation indicates that the layer-2 based relaying is to be adopted for the path between the source device and the target device.

In accordance with an exemplary embodiment, the third terminal device may support the layer-2 based relaying. In accordance with another exemplary embodiment, the third terminal device may not support the layer-2 based relaying. It can be appreciated that even if the third terminal device does not support the layer-2 based relaying, the layer-2 based relaying may also be enabled for the path between the source device and the target device.

In accordance with an exemplary embodiment, the layer-2 based relaying may be performed by an adaptation layer entity with one or more adaptation layer functionalities. In an embodiment, the one or more adaptation layer functionalities may be activated for the third terminal device according to one or more elements similar to those for activating adaptation layer functionalities for the second terminal device according to the fifth aspect of the present disclosure.

In accordance with an exemplary embodiment, the method according to the ninth aspect of the present disclosure may further comprise: transmitting a packet including an adaptation layer header to the first terminal device, when adaptation layer functionality based relaying is adopted for the path between the source device and the target device.

In accordance with an exemplary embodiment, the method according to the ninth aspect of the present disclosure may further comprise: receiving a packet including an adaptation layer header from the first terminal device, when adaptation layer functionality based relaying is adopted for the path between the source device and the target device.

In accordance with an exemplary embodiment, the method according to the ninth aspect of the present disclosure may further comprise: mapping one or more SLRBs to a sidelink LCH, according to a predetermined criterion (e.g., the predetermined criterion according to the first aspect of the present disclosure).

In accordance with an exemplary embodiment, the method according to the ninth aspect of the present disclosure may further comprise: indicating whether an adaptation layer header is included in a packet transmitted by the third terminal device.

In accordance with an exemplary embodiment, the method according to the ninth aspect of the present disclosure may further comprise: multiplexing packets according to whether an adaptation layer header is included in each of the packets.

In accordance with an exemplary embodiment, the method according to the ninth aspect of the present disclosure may further comprise: multiplexing packets to be transmitted to different layer-2 destinations into a PDU, and each of the packets may have an associated adaptation layer header.

In accordance with an exemplary embodiment, the different layer-2 destinations may be corresponding to the same device, and the PDU may have a header including information about one of the different layer-2 destinations.

In accordance with an exemplary embodiment, the method according to the ninth aspect of the present disclosure may further comprise: receiving configuration information about the relaying for direct D2D communication from a network node.

According to a tenth aspect of the present disclosure, there is provided an apparatus which may be implemented as a third terminal device. The apparatus may comprise one or more processors and one or more memories storing computer program codes. The one or more memories and the computer program codes may be configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus which may be implemented as a third terminal device. The apparatus may comprise a receiving unit and a determining unit. In accordance with some exemplary embodiments, the receiving unit may be operable to carry out at least the receiving step of the method according to the ninth aspect of the present disclosure. The determining unit may be operable to carry out at least the determining step of the method according to the ninth aspect of the present disclosure.

According to a thirteenth aspect of the present disclosure, there is provided a method performed by a network node such as a base station. The method comprises transmitting configuration information about relaying for direct D2D communication to a terminal device (e.g., the first terminal device according to the first aspect of the present disclosure, the second terminal device according to the fifth aspect of the present disclosure, the third terminal device according to the ninth aspect of the present disclosure, etc.).

In accordance with an exemplary embodiment, the configuration information may include one or more parameters for configuring an adaptation layer entity of the terminal device.

In accordance with an exemplary embodiment, the method according to the thirteenth aspect of the present disclosure may further comprise: informing the terminal device of a predetermined criterion (e.g., the predetermined criterion according to the first aspect of the present disclosure) about mapping one or more SLRBs to a sidelink LCH.

According to a fourteenth aspect of the present disclosure, there is provided an apparatus which may be implemented as a network node. The apparatus may comprise one or more processors and one or more memories storing computer program codes. The one or more memories and the computer program codes may be configured to, with the one or more processors, cause the apparatus at least to perform any step of the method according to the thirteenth aspect of the present disclosure.

According to a fifteenth aspect of the present disclosure, there is provided a computer-readable medium having computer program codes embodied thereon which, when executed on a computer, cause the computer to perform any step of the method according to the thirteenth aspect of the present disclosure.

According to a sixteenth aspect of the present disclosure, there is provided an apparatus which may be implemented as a network node. The apparatus may comprise a transmitting unit and optionally an informing unit. In accordance with some exemplary embodiments, the transmitting unit may be operable to carry out at least the transmitting step of the method according to the thirteenth aspect of the present disclosure. The informing unit may be operable to carry out at least the informing step of the method according to the thirteenth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1A:
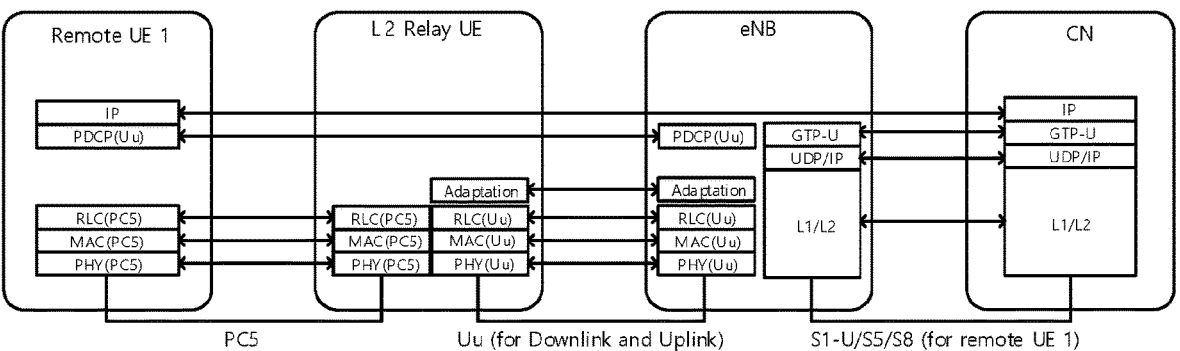
FIGS. 1A-1B are diagrams illustrating exemplary protocol stacks for layer-2 evolved UE-to-Network relay according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. To meet dramatically increasing network requirements on traffic capacity and data rates, one interesting option for communication technique development is to allow D2D communications to be implemented in a wireless communication network such as 4G/LTE or 5G/NR network. As used herein, D2D may be referred to in a broader sense to include communications between any type of UEs, and include V2X communications between a vehicle UE and any other type of UE. D2D and/or V2X may be a component of many existing wireless technologies when it comes to direct communication between wireless devices. D2D and/or V2X communications as an underlay to cellular networks may be proposed as an approach to take advantage of the proximity of devices.

3GPP specifies the LTE D2D technology, also known as proximity services (ProSe), in Release 12 and Release 13 of LTE. Later in Release 14 and Release 15, LTE V2X related enhancements targeting the specific characteristics of vehicular communications are specified. 3GPP has started a new work item (WI) within the scope of Release 16 to develop a NR version of V2X communications. The NR V2X mainly targets advanced V2X services, which can be categorized into four use case groups: vehicles platooning, extended sensors, advanced driving and remote driving. The advanced V2X services may require the enhanced NR system and new NR sidelink framework to meet the stringent requirements in terms of latency and reliability. The NR V2X system may also expect to have higher system capacity and better coverage and to allow for an easy extension to support the future development of further advanced V2X services and other services.

Given the targeted services by NR V2X, it is commonly recognized that groupcast/multicast and unicast transmissions may be desired, in which the intended receiver(s) of a message may consist of only a subset of the vehicles in proximity to the transmitter (groupcast) or of a single vehicle (unicast). For example, in the platooning service, there may be certain messages that are only of interest of the members of the platoon, making the members of the platoon a natural groupcast. In another example, the see-through use case most likely involves only a pair of vehicles, for which unicast transmissions naturally fit. Therefore, NR sidelink can support broadcast (as in LTE), groupcast and unicast transmissions. Furthermore, NR sidelink may be designed in such a way that its operation is possible with and without network coverage and with varying degrees of interaction between the UEs and the network (NW), including support for standalone, network-less operation.

In 3GPP Release 17, national security and public safety (NSPS) may be considered to be one important use case, which can benefit from the already developed NR sidelink features in Release 16. Therefore, it is most likely that 3GPP may specify enhancements related to NSPS use case taking NR Release 16 sidelink as a baseline. Besides, in some scenarios, NSPS services need to operate with partial or without NW coverage, such as indoor firefighting, forest firefighting, earthquake rescue, sea rescue, etc. where the infrastructure is (partially) destroyed or not available. Therefore, coverage extension may be a crucial enabler for NSPS, for both NSPS services communicated between UE and cellular NW and that communicated between UEs over sidelink.

In Release 14 and Release 15, a layer-2 evolved UE-to-Network relay is introduced. The remote UE's user plane and control plane data may be relayed above radio link control (RLC) via the evolved UE-to-Network relay UE. The packet data convergence protocol (PDCP) and radio resource control (RRC) are terminated between the evolved remote UE and the eNB, while RLC, the medium access control (MAC) and physical layer protocol (PHY) are terminated in each hop.

Figure 1B:
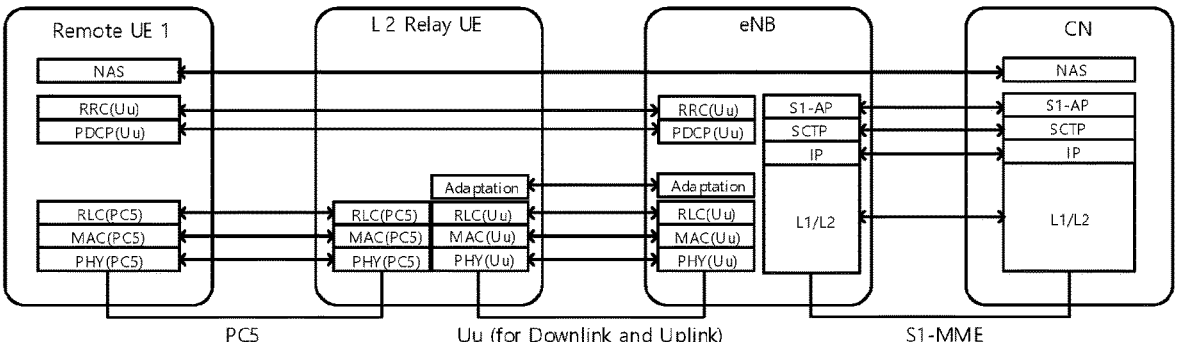

FIGS. 1A-1B are diagrams illustrating exemplary protocol stacks for layer-2 evolved UE-to-Network relay according to some embodiments of the present disclosure. The exemplary protocol stacks may be applicable to a communication scenario in which a remote UE 1 can communicate with an eNB (and then with a core network (CN)) via a layer-2 (L2) evolved UE-to-Network relay UE. The user plane radio protocol stack for layer-2 evolved UE-to-Network relay is shown in FIG. 1A, and the control plane radio protocol stack for layer-2 evolved UE-to-Network relay is shown in FIG. 1B.

As described in section 5.1.1 of 3GPP TS 36.746 V15.1.1, where the entire content of this technical specification is incorporated into the present disclosure by reference, the adaptation layer between the evolved UE-to-Network relay UE and the eNB may be able to differentiate between Uu bearers of a particular evolved remote UE. Different evolved remote UEs and different Uu bearers of the evolved remote UE may be indicated by additional information (e.g. UE identifiers (IDs) and bearer IDs) included in an adaptation layer header which may be added to a PDCP protocol data unit (PDU). The adaptation layer can be considered as part of the PDCP sublayer or a separate new layer between the PDCP sublayer and the RLC sublayer.

In accordance with an exemplary embodiment, one functionality of the adaptation layer may be mapping bearers associated with similar quality of service (QoS) characteristics into the same logical channel (LCH) in the Uu interface between the layer-2 evolved UE-to-Network relay and the eNB. The bearers may target one or more remote UE(s) or the layer-2 evolved UE-to-Network relay. In the PC5 interface, different Uu bearers of an evolved remote UE may be distinguished by different sidelink logical channel identifiers (LCIDs).

In accordance with an exemplary embodiment, the per-flow based QoS model similar as that introduced for NR Uu may be adopted for NR sidelink for various cast types (e.g. unicast, groupcast and broadcast), where a user plane data traffic may be first mapped to a QoS flow in e.g. V2X layer, and the QoS flow may be mapped to a sidelink data radio bearer (SL-DRB) in the service data adaptation protocol (SDAP) layer.

In accordance with an exemplary embodiment, some sidelink radio bearer (SLRB) parameters, such as SLRB identity, LCH identity, mapping of QoS flow(s) to SLRB, RLC mode, PDCP sequence number size, etc., may be related to both transmitting (TX) UE and receiving (RX) UE (at least for unicast). For sidelink unicast, an initiating UE may inform the peer UE of SLRB parameters that are related to both TX and RX using RRC signaling, i.e. PC5-RRC. In some cases, PC5-RRC also may be used to exchange between peer UEs some sidelink access stratum level (AS-level) information, such as sidelink UE capabilities and sidelink AS-layer configurations. For sidelink unicast link establishment and release, a non-access stratum (NAS) layer control signaling (i.e. PC5-S) may be used. PC5-RRC signaling exchange may be started after initial PC5-S connection setup. PC5-RRC and PC5-S may be carried on sidelink signaling radio bearer (SL-SRB). The SL-SRB carrying PC5-S signaling may be separated from the SL-SRB carrying PC5-RRC signaling.

The sidelink LCH that carries SL-DRB may be named sidelink traffic channel (STCH), while the sidelink LCH that carries SL-SRB may be named sidelink control channel (SCCH). Different SCCHs carrying PC5-S signaling and PC5-RRC signaling respectively may be multiplexed into one MAC PDU for the same destination, and SCCH and STCH may also be multiplexed into one MAC PDU for the same destination, both in a way similar to multiplexing of different STCHs.

In accordance with an exemplary embodiment, a specified configuration may be used for SCCH, e.g. fixed LCH priority values, fixed LCH identities, respectively for SCCH carrying PC5-RRC signaling and SCCH carrying PC5-S signaling. In this way, the UE can know from the LCH identity whether it is PC5-RRC signaling, PC5-S signaling, or data traffic that is contained in the PDCP service data unit (SDU) on that LCH, and can take further action properly, e.g. which layer the PDCP SDU may be handled in or sent to.

Figure 2:
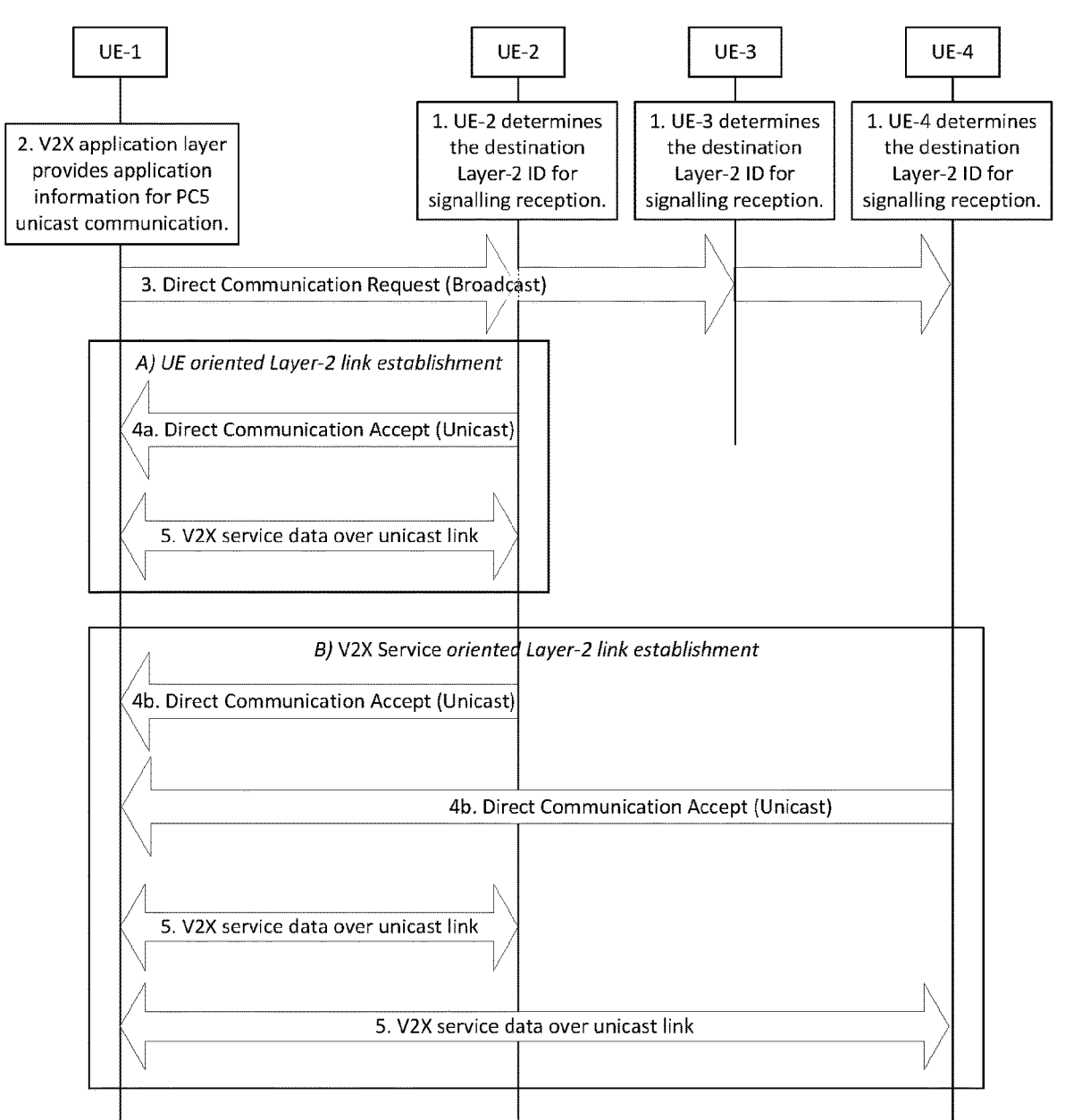
FIG. 2 is a diagram illustrating an exemplary layer-2 link establishment procedure according to an embodiment of the present disclosure.

FIG. 2 is a diagram illustrating an exemplary layer-2 link establishment procedure according to an embodiment of the present disclosure. The exemplary procedure may be performed to establish a unicast connection in a single hop NR sidelink network. As described in section 6.3.3 of 3GPP TS 23.287 V2.0.0, where the entire content of this technical specification is incorporated into the present disclosure by reference, the layer-2 link establishment procedure as shown in FIG. 2 may include the following steps:

1. A UE (e.g., UE-2, UE-3 and UE-4) may determine the destination layer-2 ID for signaling reception for PC5 unicast link establishment. The destination layer-2 ID may be configured with the UE.
2. The V2X application layer in UE-1 may provide application information for PC5 unicast communication. The application information may include the service type(s) of the V2X application and the initiating UE's application layer ID. The target UE's application layer ID may be included in the application information. In an embodiment, the V2X application layer in UE-1 may provide V2X application requirements for this unicast communication. UE-1 can determine the PC5 QoS parameters and PC5 flow indicator (PFI).
3. UE-1 may send a direct communication request message to initiate the unicast layer-2 link establishment procedure. The direct communication request message may include:
   Source user information: the initiating UE's application layer ID.
   If the V2X application layer provides the target UE's application layer ID in step 2, the following information may be included:
      Target user information: the target UE's application layer ID (e.g. UE-2's application layer ID).
   V2X service information: the information about V2X service(s) requesting layer-2 link establishment.
   Indication whether Internet protocol (IP) communication is used.
   IP address configuration.
   QoS information: the information about PC5 QoS flow(s), for each PC5 QoS flow, e.g. including the PFI and the corresponding PC5 QoS parameters.

As shown in FIG. 2, the source layer-2 ID and destination layer-2 ID used to send the direct communication request message may be determined by step 1 and step 2. UE-1 may send the direct communication request message via PC5 broadcast using the determined source layer-2 ID and the destination layer-2 ID.

4. A direct communication accept message may be sent to UE-1 as below:
   4a. (UE oriented layer-2 link establishment) If the target user information is included in the direct communication request message, the target UE (e.g. UE-2) may respond with a direct communication accept message.
   4b. (V2X service oriented layer-2 link establishment) If the target user information is not included in the direct communication request message, the UEs that are interested in using the announced V2X service (s), e.g. UE-2 and UE-4 in FIG. 2, may decide to establish a layer-2 link with UE-1 and respond to the request by sending a direct communication accept message.

The direct communication accept message may include:
Source user information: the application layer ID of the UE sending the direct communication accept message.
QoS information: the information about PC5 QoS flow(s), for each PC5 QoS flow, e.g. including the PFI and the corresponding PC5 QoS parameters requested by UE-1.
IP address configuration.
5. V2X service data may be transmitted over the established unicast link. For example, UE-1 may send the V2X service data by using the source layer-2 ID (i.e. UE-1's layer-2 ID for this unicast link) and the destination layer-2 ID (i.e. the peer UE's layer-2 ID for this unicast link).

It can be appreciated that although various embodiments are explained in the context of V2X communications, some embodiments can also be used for other types of direct communications, including D2D and other sidelink communications. Accordingly, the term "V2X" herein can be replaced with the term "D2D" for some exemplary embodiments. Moreover, although some embodiments are described in the context of NR sidelink communications, they may be applicable to any kind of direct communications between UEs involving D2D communications.

In accordance with some exemplary embodiment, one or more relay UEs may be configured over sidelink (i.e. UE-to-UE relay) to extend sidelink coverage. Layer-2 based relaying (e.g., by utilizing adaptation layer functionalities) and/or other types of relaying may be adopted for a multi-hop path of UE-to-UE relay communication. However, some UEs may not support layer-2 based relaying or adaptation layer functionalities. Currently, there may be a need for a mechanism/procedure to configure/enable layer-2 based relaying (e.g., adaptation layer functionalities) according to the relevant UE capability, especially for communications between UEs where there is no central control node in the NW.

Various exemplary embodiments of the present disclosure propose a solution for enabling and utilization of adaptation layer functionalities in sidelink. In accordance with some exemplary embodiments, the layer-2 based relaying (e.g., adaptation layer functionalities) and/or other types of relaying applicable for UE-to-UE relay in NR sidelink may be properly configured or set up, for example, by exchanging capability information about relaying over sidelink. In addition, the single hop sidelink unicast communication may also be enhanced in the case that a UE needs to transmit towards multiple sidelink destinations (i.e., multiple sidelink L2 IDs).

Figure 3A:
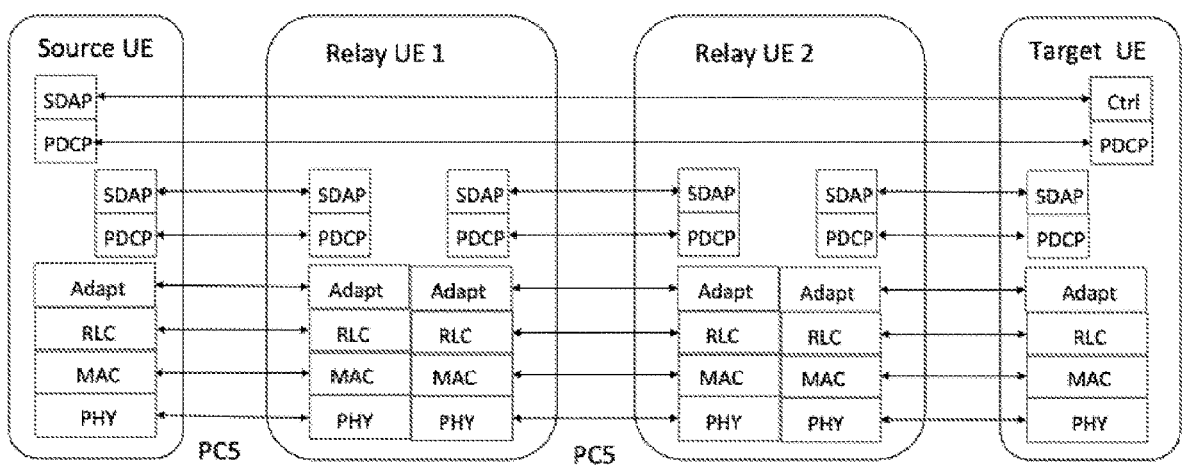
FIGS. 3A-3B are diagrams illustrating exemplary protocol stacks for layer-2 UE-to-UE relay in a NR sidelink according to some embodiments of the present disclosure.
Figure 3B:
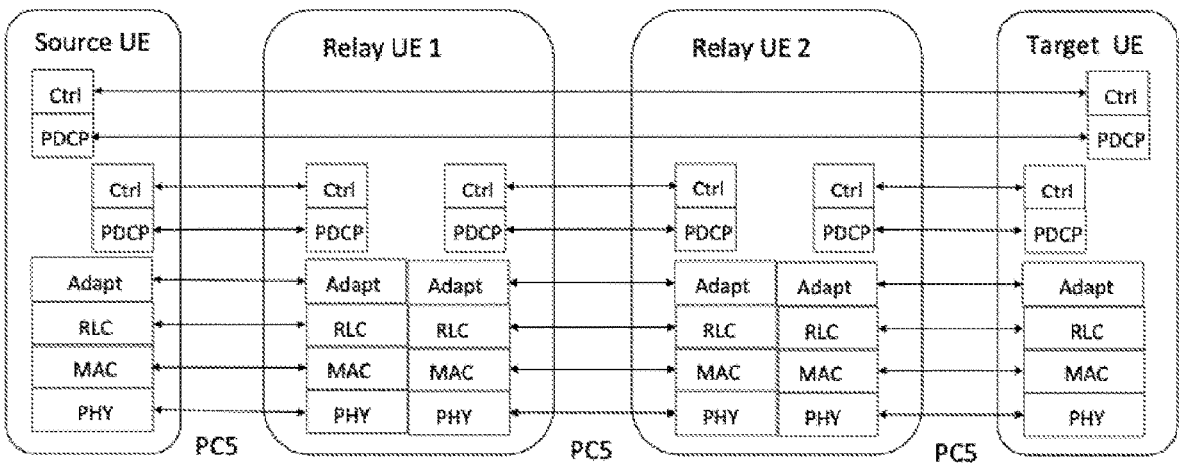

FIGS. 3A-3B are diagrams illustrating exemplary protocol stacks for layer-2 UE-to-UE relay in a NR sidelink according to some embodiments of the present disclosure.

For simplicity, FIG. 3A and FIG. 3B only depict some exemplary network elements such as a source UE, relay UE 1, relay UE 2 and a target UE, and some exemplary protocol functional entities such as PHY, MAC, RLC, adaptation layer entity (also called Adapt for short), PDCP, SDAP, etc. It can be recognized that functional entities and network elements shown in FIGS. 3A-3B are just as examples, and more or less alternative functional entities and network elements may be involved in the layer-2 UE-to-UE relay in the NR sidelink according to some embodiments of the present disclosure.

FIG. 3A shows an exemplary user plane radio protocol stack for NR sidelink with layer-2 UE-to-UE relay, and FIG. 3B shows an exemplary control plane radio protocol stack for NR sidelink with layer-2 UE-to-UE relay. Similar to layer-2 evolved UE-to-Network relay as shown in FIG. 1A and FIG. 1B, there may be an end-to-end sidelink unicast connection, SL-DRB and SL-SRB established between the source UE and the target UE, while RLC, MAC and PHY are terminated in each hop. In each UE, there may be an adaptation layer entity, which is able to differentiate between SLRBs from a particular UE and/or towards another particular UE. In an embodiment, SLRBs/SL LCHs for different paths may be handled by the same adaptation layer entity. The adaptation layer entity in each UE may also perform routing so that a packet from the source UE can reach the target UE over a multi-hop path.

In accordance with some exemplary embodiments, an adaptation layer header, which may be added to a PDCP PDU, may include information of any combination of the following:

a source (L2) ID of the source UE;

a destination (L2) ID of the target UE;

an end-to-end SLRB ID; and

IDs related to segmentation or duplication of the given packet.

In accordance with some exemplary embodiments, the adaptation layer entity may be able to map SLRBs associated with similar QoS characteristics into the same SL LCH. The SLRBs may be associated with the same link or different links. For instance, the source UE in FIG. 3A and FIG. 3B may map one or more SLRBs towards the target UE as well as one or more SLRBs towards relay UE 1 into the same SL LCH between the source UE and relay UE 1; relay UE 1 may map one or more SLRBs relayed via relay UE 2 as well as one or more SLRBs towards relay UE 2 into the same SL LCH between relay UE 1 and relay UE 2; while relay UE 2 may map one or more SLRBs towards the target UE into the same SL LCH between relay UE 2 and the target UE (where the SLRBs may be originated by some other UE(s) and forwarded by relay UE 2 or originated by relay UE 2 itself).

In accordance with some exemplary embodiments, the layer-2 UE-to-UE relay may be adopted in the case that layer-2 based relaying (e.g. adaptation layer functionalities, etc.) are supported at least at both the source UE and all the relay UEs between the source UE and the target UE. One way to know whether the source UE and the relay UEs support the layer-2 based relaying may be to include the support/preference information of the layer-2 based relaying (e.g., adaptation layer functionalities, etc.) in a capability message exchanged between the UEs.

In accordance with some exemplary embodiments, a UE that initiates sidelink unicast connection establishment, also called source UE or initiating UE, may include support/preference information in e.g. a direct communication request. The support/preference information may indicate whether adaptation layer functionalities are supported/preferred to be used, and/or that (only) layer-2 based relay is supported, and/or the types of relaying that are supported in the case that the UE may support more than one type of relaying (e.g. both layer-2 based relaying and layer-3 based relaying). A relay UE (denoted as current relay UE below) that receives the direct communication request from either the initiating UE or another relay UE may then know the support/preference information of the initiating UE and the preceding relay UE(s) (if exist), and take proper actions based at least in part on the support/preference information. For example, there may be the following two options for the current relay UE:

Option I: Further forwarding the received direct communication request if:

Layer-2 based relaying (e.g. adaptation layer functionalities, etc.) is supported/preferred by the initiating UE and all the relay UE(s) (including the current relay UE) that have received the direct communication request either directly or indirectly from the initiating UE.

Layer-2 based relaying (e.g. adaptation layer functionalities, etc.) is not supported/preferred by the current relay UE, while other type(s) of relaying (e.g., layer-3 based relaying, etc.) in addition or alternative to the layer-2 based relaying is supported by the initiating UE and all the relay UE(s) (including the current relay UE).

According to an exemplary embodiment, the current relay UE may update the support/preference information in e.g. the direct communication request that the current relay UE forwards out. The support/preference information may adopt any of the following format:

An overall indication for the initiating UE and all the relay UE(s) (including the current relay UE).

An indication for the initiating UE and another indication for all the relay UE(s) (including the current relay UE).

Separate indications for the initiating UE and each of the relay UE(s) (including the current relay UE).

According to an exemplary embodiment, the indication regarding adaptation layer functionalities may be set to true if adaptation layer functionalities are supported/preferred by all the UEs that the indication relates to. According to another exemplary embodiment, the indication regarding a certain type of relaying may be set to true if that type of relaying is supported/preferred by all the UEs that the indication relates to.

According to an exemplary embodiment, the indication may be linked in the order on which the direct communication request is received (e.g., the source UE is associated with GroupID 1, the relay UE 1 is associated with GroupID 2, and so on). This may be also useful to identify each UE in the multi-hop transmission and how many relay UEs are present.

Option II: Not forwarding the received direct communication request if:

Layer-2 based relaying (e.g. adaptation layer functionalities, etc.) is not supported/preferred by the current relay UE and only layer-2 based relaying (e.g. adaptation layer functionalities, etc.) is supported/preferred by the initiating UE and all the preceding relay UE(s) (if exist).

According to an exemplary embodiment, the current relay UE may inform the support/preference information of itself to a neighbor UE from which the direct communication request is received. In the case that unicast transmission is used, the current relay UE may include the support/preference information of itself in a direct communication reject message transmitted to the neighbor UE. According to another exemplary embodiment, the current relay UE may inform the support/preference information of itself to all the UEs in broadcast manner.

In accordance with some exemplary embodiments, the target UE may know from the support/preference information contained in e.g. the direct communication request whether the layer-2 based relaying may be adopted along a certain path from the source UE to the target UE. According to an exemplary embodiment, the target UE may indicate/confirm the type of relaying that may be adopted for the certain path to the relay UE (denoted the last relay UE hereafter) in this path and directly communicating to the target UE. In an embodiment, the indication/confirmation information from the target UE may be sent using e.g. PC5-RRC or PC5-S signaling (e.g. in the direct communication accept message). The last relay UE may then forward the indication/confirmation information to the preceding (relay) UE in the certain path, and so forth, until the indication/confirmation information reaches the source UE.

In accordance with some exemplary embodiments, in the case that a specific type of relaying is supported/preferred by the source UE and all the relay UE(s), the target UE may indicate/confirm that the specific type of relaying may be adopted for the path from the source UE to the target UE, even if the target UE does not support this type of relaying. According to an exemplary embodiment, the target UE may indicate whether it supports the specific type of relaying (e.g., the layer-2 based relaying, adaptation layer functionalities, etc.) to the last relay UE, for example, in sidelink control information (SCI), in the MAC PDU header, or using PC5-RRC or PC5-S signaling. According to another exemplary embodiment, the relay UE may not indicate whether it supports the specific type of relaying (e.g., the layer-2 based relaying, adaptation layer functionalities, etc.) to the preceding UE.

In accordance with some exemplary embodiments, the layer-2 based relaying may be adopted for a certain path. In this case, the target UE in this path may add the adaptation layer header in the packets transmitted to the last relay UE, if the target UE also supports the adaptation layer functionalities. The last relay UE may add the adaptation layer header in the packets transmitted to the preceding UE (i.e. the source UE or the second last relay UE if exist) in the path. Optionally, the last relay UE may also add the adaptation layer header in the packets transmitted to the target UE in the case that the target UE also supports the adaptation layer functionalities. All the other UE(s) (i.e. except the target UE and the last relay UE) in the path may add the adaptation layer header in the packets transmitted to its neighbor UE(s) in the path, no matter the target UE supports the adaptation layer functionalities or not. In this way, the adaptation layer functionalities may be enabled and the layer-2 based relaying may be performed for transmissions from the source UE to the target UE in that path.

In accordance with some exemplary embodiments, the establishment/initialization/activation/update of an adaptation layer entity (also called adaptation layer for short) of a UE may occur in any combination of the following cases:
    there are no existing (active) adaptation layer;
    the path is a multi-hop path where relay is needed;
    the UE receives/transmits a message (e.g. a direct communication request message, etc.) to establish a layer-2 relay path;

the UE receives/transmits a message (e.g. a direct communication accept message, etc.) to establish a layer-2 relay path;
    the UE receives/transmits a packet (e.g. data) from/to an LCH/SLRB that indicates a multi-hop path (e.g., a set of LCH IDs/SLRB IDs may be reserved for multi-hop traffic transmission);
    the UE receives a SLRB configuration from a gNB with an indication that the adaptation layer needs to be configured; and
    the UE receives a SLRB configuration with one or more parameters to be used to configure/establish the adaptation layer.

It can be appreciated that the term "transmit" as described in various embodiments may refer to "initiate transmission" and/or "forward the received transmission". Thus, for the case that a first UE transmits information/data/packet to a second UE, it may mean that the first UE generates information/data/packet and initiates the transmission of the generated information/data/packet to the second UE, or that the first UE receives information/data/packet from a third UE and forwards the received information/data/packet to the second UE.

In accordance with some exemplary embodiments, the adaptation layer may map multiple SLRBs with similar QoS characteristics to the same sidelink LCH. In this case, sidelink SRB(s) and sidelink DRB(s) may be mapped to the same sidelink LCH. The receiving UE may not differentiate from LCH ID whether it is SRB, DRB, or both, that are carried on the sidelink LCH and thus may not act properly. This may be solved in various ways. In an embodiment, the adaptation layer may not map (sidelink) SRB(s) and DRB(s) to the same (sidelink) LCH. In another embodiment, some SLRB IDs may be reserved for transmitting sidelink control signaling, for example, out of which some SLRB IDs may be reserved to transmitting PC5-RRC while some may be reserved for transmitting PC5-S. In another embodiment, for a relay UE, traffics received from SL LCHs/SLRBs for PC5-RRC/PC5-S/data may be only mapped to SL LCHs/SLRBs for transmitting PC5-RRC/PC5-S/data in the next hop. That is, the type of SL LCHs/SLRBs from which the traffics are received may be the same as the type of SL LCHs/SLRBs to which the traffic s are transmitted. Alternatively or additionally, a SLRB type (e.g., SRB or DRB) may be included in the SRLB configuration to identify whether the concerned SLRB is a SRB or DRB. According to an embodiment, at least part of configuration for SLRB may be performed by the NW, e.g. using dedicated or common RRC signaling, and/or preconfigured in a UE. In an embodiment, the UE may inform such configuration to other UE(s) using PC5-RRC.

In accordance with some exemplary embodiments, a specific UE may transmit or forward traffics to different UEs via the same relay UE, while the layer-2 based relaying may only be performed for transmissions towards some of the UEs, which means some packets transmitted by the specific UE may include the adaptation layer header while some others may not. It may be beneficial to indicate whether the adaptation layer header is present or not in a packet, so that e.g. the relay UE receiving the packet may know whether the relaying need to be performed in layer-2 or other layer(s). According to an embodiment, whether the adaptation layer header is present or not in a packet may be indicated in SCI or the MAC PDU header, e.g. by an indicator with one or more bits. Optionally, a restriction may be introduced that packets with the adaptation layer header and packets without the adaptation layer header may not be multiplexed together.

For single hop sidelink unicast communication, currently transmissions to different layer-2 destinations may not be multiplexed into the same MAC PDU, even the different layer-2 destinations are corresponding to the same physical UE. In accordance with some exemplary embodiments, such multiplexing may be realized by adding the adaptation layer header to a PDCP PDU also for single hop sidelink unicast communication, where the adaptation layer header may contain the information about the layer-2 destinations. In this case, PDCP PDUs transmitted to different layer-2 destinations corresponding to the same physical UE may be multiplexed into the same MAC PDU. In an embodiment, the destination field in the MAC PDU header may be set to one of the layer-2 destinations corresponding to the physical UE. This may be useful in improving sidelink resource utilization especially in low load situation.

It can be appreciated that although various embodiments for layer-2 based relaying are described in the context of adaptation layer in layer-2, the layer-2 based relaying may also be implemented by other (sub)-layer than the adaptation layer in layer-2. In that case, various embodiments related to the adaptation layer and/or the adaptation layer entity may be equally applicable to the (sub)-layer which may be able to implement layer-2 based relaying.

It also can be appreciated that although various embodiments of relaying for direct D2D communication are described in the context of layer-2, the relaying for direct D2D communication may also be implemented by other (sub)-layer than layer-2, e.g. layer-1, layer-3 or any higher layer. In that case, various embodiments related to layer-2 may be equally applicable to the (sub)-layer which may be able to implement the relaying for direct D2D communication.

It is noted that some embodiments of the present disclosure are mainly described in relation to 4G/LTE or 5G/NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 4A:
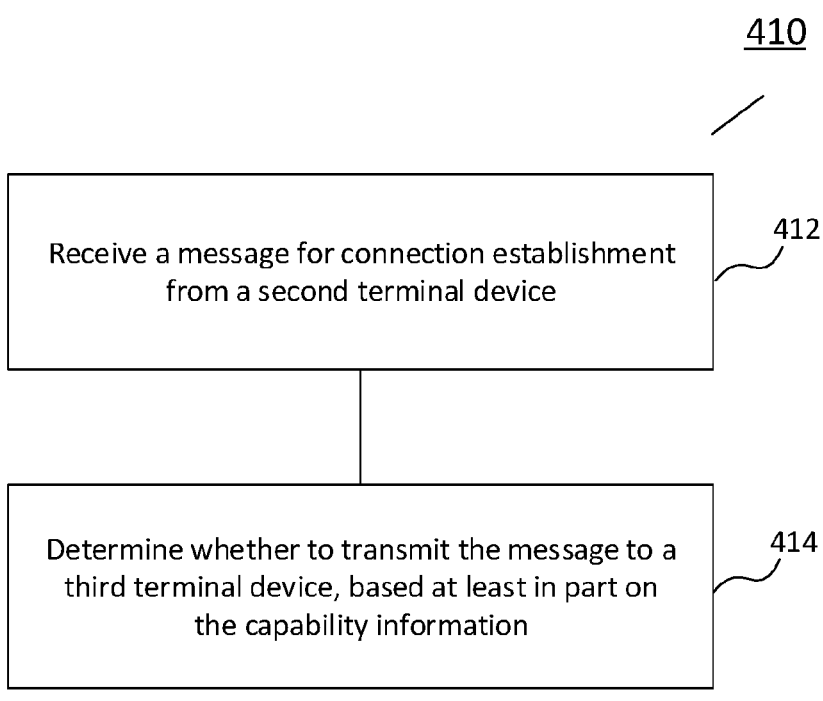
FIGS. 4A-4D are flowcharts illustrating various methods according to some embodiments of the present disclosure.

FIG. 4A is a flowchart illustrating a method 410 according to some embodiments of the present disclosure. The method 410 illustrated in FIG. 4A may be performed by a first terminal device (e.g., relay UE 1/relay UE 2 shown in FIGS. 3A-3B) or an apparatus communicatively coupled to the first terminal device. In accordance with an exemplary embodiment, the first terminal device may be configured to support direct D2D communication (e.g., V2X or sidelink communication, etc.) with other terminal devices. In an exemplary embodiment, the first terminal device may be configured to communicate with a network node such as a base station.

According to the exemplary method 410 illustrated in FIG. 4A, the first terminal device may receive a message for connection establishment (e.g., a request message such as the direct communication request as described with respect to FIG. 2, FIG. 3A and FIG. 3B) from a second terminal device (e.g., the source UE/relay UE 1 shown in FIGS. 3A-3B), as shown in block 412. In an embodiment, the message may include capability information (e.g., the support/preference information as described with respect to FIG. 3A and FIG. 3B) about relaying for direct D2D communication. Based at least in part on the capability information, the first terminal device may determine whether to transmit the message to a third terminal device (e.g., the relay UE 2/the target UE shown in FIGS. 3A-3B), as shown in block 414.

In accordance with some exemplary embodiments, the relaying for direct D2D communication may comprise layer-2 based relaying and/or layer-3 based relaying. It can be appreciated that the relaying for direct D2D communication may also comprise other types of relaying (e.g., layer-1 based relaying and/or other higher layer based relaying).

In accordance with some exemplary embodiments, the layer-2 based relaying may comprise adaptation layer functionality based relaying. It can be appreciated that the layer-2 based relaying may also comprise relaying based on other sub-layer functionalities which may be used for the direct D2D communication.

In accordance with some exemplary embodiments, the determination of whether to transmit the message to the third terminal device based at least in part on the capability information may comprise: determining to transmit the message to the third terminal device, when the first terminal device supports layer-2 based relaying, and the capability information indicates that the second terminal device supports the layer-2 based relaying. In this case, the second terminal device may be a source device initiating the connection establishment.

In accordance with some exemplary embodiments, the determination of whether to transmit the message to the third terminal device based at least in part on the capability information may comprise: determining to transmit the message to the third terminal device, when the first terminal device supports another type of relaying different from layer-2 based relaying, and the capability information indicates that the second terminal device supports the another type of relaying. In this case, the second terminal device may be a source device initiating the connection establishment.

In accordance with some exemplary embodiments, the determination of whether to transmit the message to the third terminal device based at least in part on the capability information may comprise: determining not to transmit the message to the third terminal device, when layer-2 based relaying is not supported by the first terminal device, and the capability information indicates that the second terminal device only supports the layer-2 based relaying. In this case, the second terminal device may be a source device initiating the connection establishment.

In accordance with some exemplary embodiments, the determination of whether to transmit the message to the third terminal device based at least in part on the capability information may comprise: determining to transmit the message to the third terminal device, when the first terminal device supports layer-2 based relaying, and the capability information indicates that a source device initiating the connection establishment and each relay device between the source device and the first terminal device support the layer-2 based relaying. In this case, the second terminal device may be a relay device between the source device and the first terminal device.

In accordance with some exemplary embodiments, the determination of whether to transmit the message to the third terminal device based at least in part on the capability information may comprise: determining to transmit the message to the third terminal device, when the first terminal device supports another type of relaying different from layer-2 based relaying, and the capability information indicates that a source device initiating the connection establishment and each relay device between the source device and the first terminal device support the another type of relaying. In this case, the second terminal device may be a relay device between the source device and the first terminal device.

In accordance with some exemplary embodiments, the determination of whether to transmit the message to the third terminal device based at least in part on the capability information may comprise: determining not to transmit the message to the third terminal device, when layer-2 based relaying is not supported by the first terminal device, and the capability information indicates that a source device initiating the connection establishment and each relay device between the source device and the first terminal device only support the layer-2 based relaying. In this case, the second terminal device may be a relay device between the source device and the first terminal device.

In accordance with some exemplary embodiments, the first terminal device may inform one or more other devices (e.g., neighbor devices of the first terminal device, etc.) of which type of relaying is supported by the first terminal device.

In accordance with some exemplary embodiments, when determining not to transmit the message to the third terminal device, the first terminal device may transmit a response (e.g., the direct communication reject message as described with respect to FIG. 3A and FIG. 3B) to the second terminal device to reject the connection establishment.

In accordance with some exemplary embodiments, the first terminal device may update the capability information included in the message for connection establishment, e.g. according to whether the relaying for direct D2D communication is supported by the first terminal device, and/or which type(s) of relaying may be supported by the first terminal device. In an embodiment, the update of the capability information may comprise updating the support/preference information about relaying of the source device, the first terminal device, and/or each relay device between the source device and the first terminal device, e.g. in a format of the support/preference information as described with respect to FIG. 3A and FIG. 3B.

In accordance with some exemplary embodiments, when determining to transmit the message to the third terminal device, the first terminal device may transmit the message for connection establishment to the third terminal device.

In accordance with some exemplary embodiments, the first terminal device may receive, from the third terminal device, a confirmation of a target device with respect to the connection establishment. The confirmation may indicate which type of relaying is to be adopted for a path between the source device and the target device.

In accordance with some exemplary embodiments, the first terminal device may transmit the confirmation with respect to the connection establishment to the second terminal device, in response to the reception of the confirmation from the third terminal device.

In accordance with some exemplary embodiments, the first terminal device may receive, from the third terminal device, information about whether the third terminal device supports the layer-2 based relaying. In this case, the third terminal device may be the target device of the connection establishment. In accordance with some exemplary embodiments, the first terminal device may receive, from the third terminal device, information about which type of relaying is supported by the third terminal device.

In accordance with some exemplary embodiments, when the confirmation indicates that the layer-2 based relaying is to be adopted for the path between the source device and the target device, the first terminal device may enable the layer-2 based relaying for the path between the source device and the target device.

In accordance with some exemplary embodiments, the layer-2 based relaying may be performed by an adaptation layer entity with one or more adaptation layer functionalities. In an embodiment, the one or more adaptation layer functionalities may be activated for the first terminal device according to one or more of the following elements:

an indication of activating an adaptation layer;

a request message for establishing a layer-2 relay path;

an accept message for establishing a layer-2 relay path;

a packet which is to be transmitted over an LCH related to a multi-hop path where the layer-2 based relaying is used;

a packet which is to be transmitted over a SLRB related to a multi-hop path where the layer-2 based relaying is used;

an indication of configuring an adaptation layer; and configuration information including one or more parameters for configuring an adaptation layer (e.g., the one or more parameters may be included in an SLRB configuration).

In accordance with some exemplary embodiments, when adaptation layer functionality based relaying is adopted for the path between the source device and the target device, the first terminal device may transmit a packet including an adaptation layer header to at least one of the second terminal device and the third terminal device.

In accordance with some exemplary embodiments, when adaptation layer functionality based relaying is adopted for the path between the source device and the target device, the first terminal device may receive a packet including an adaptation layer header from at least one of the second terminal device and the third terminal device.

In accordance with some exemplary embodiments, the adaptation layer header may include one or more of the following parameters:

a source layer-2 ID of the source device;

a destination layer-2 ID of the target device;

an end-to-end SLRB ID; and one or more IDs related to at least part of a packet.

In accordance with some exemplary embodiments, the first terminal device may map one or more SLRBs to a sidelink LCH, according to a predetermined criterion. According to an exemplary embodiment, the predetermined criterion may indicate one or more of the following requirements:

mapping a SLRB to a sidelink LCH according to a type of the SLRB;

reserving one or more SLRB IDs for sidelink control signaling;

transmitting a traffic in a type of sidelink LCH according to on which type of sidelink LCH the traffic is received;

transmitting a traffic to a SLRB according to on which type of SLRB the traffic is received; and indicating a type of a SLRB.

In accordance with some exemplary embodiments, the first terminal device may indicate whether an adaptation layer header is included in a packet transmitted by the first terminal device. According to an embodiment, an indicator may be included in SCI or MAC PDU header to indicate the presence/absence of the adaptation layer header in the packet.

In accordance with some exemplary embodiments, the first terminal device may multiplex packets according to whether an adaptation layer header is included in each of the packets.

In accordance with some exemplary embodiments, the first terminal device may multiplex packets (e.g., PDCP PDUs, etc.) to be transmitted to different layer-2 destinations into one PDU (e.g., MAC PDU, etc.). In an embodiment, each of the packets may have an associated adaptation layer header. According to an exemplary embodiment, the different layer-2 destinations may be corresponding to the same device (e.g., a physical UE, etc.), and the PDU may have a header including information about one of the different layer-2 destinations (e.g., in the destination field of the MAC PDU header).

In accordance with some exemplary embodiments, the first terminal device may receive configuration information about the relaying for direct D2D communication from a network node. According to an exemplary embodiment, the configuration information for the first terminal device may indicate SLRB configuration, adaptation layer configuration, etc. to the first terminal device.

Figure 4B:
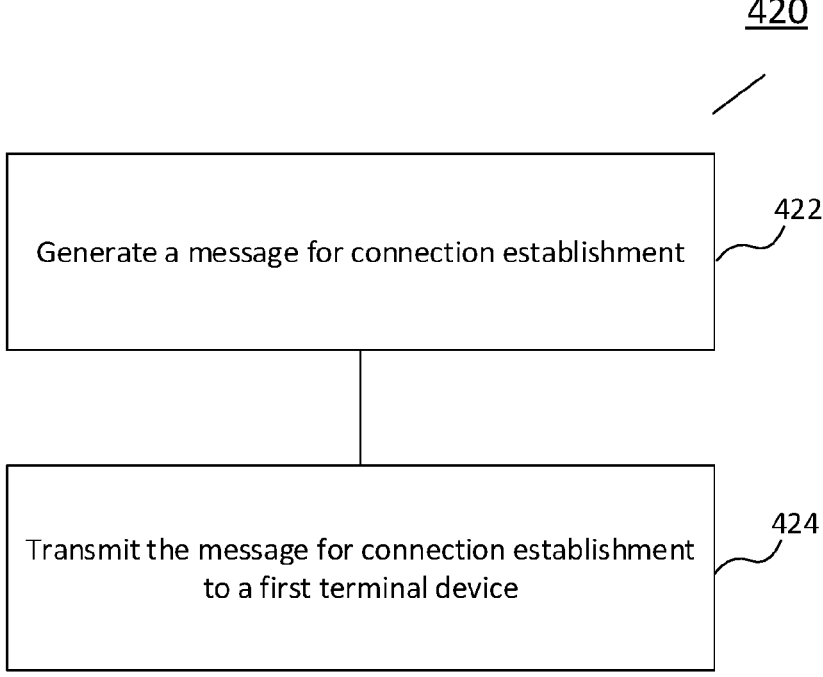

FIG. 4B is a flowchart illustrating a method 420 according to some embodiments of the present disclosure. The method 420 illustrated in FIG. 4B may be performed by a second terminal device (e.g., the source UE shown in FIGS. 3A-3B) or an apparatus communicatively coupled to the second terminal device. In accordance with an exemplary embodiment, the second terminal device may be configured to support direct D2D communication (e.g., V2X or sidelink communication, etc.) with other terminal devices. In an exemplary embodiment, the second terminal device may be configured to communicate with a network node such as a base station.

According to the exemplary method 420 illustrated in FIG. 4B, the second terminal device may generate a message for connection establishment, as shown in block 422. In an embodiment, the message may include capability information about relaying for direct D2D communication. In accordance with some exemplary embodiments, the second terminal device may transmit the message for connection establishment to a first terminal device (e.g., the first terminal device as describe with respect to FIG. 4A), as shown in block 424. The second terminal device may be a source device initiating the connection establishment, and the first terminal device may be a relay device between the source device and a target device of the connection establishment.

It can be appreciated that the message for connection establishment as described with respect to FIG. 4B may correspond to the message for connection establishment as described with respect to FIG. 4A. Thus, the message for connection establishment as described with respect to the method 420 may have the same or similar contents and feature elements as the message for connection establishment as described with respect to the method 410.

Similarly, it can be appreciated that the capability information about relaying for direct D2D communication as described with respect to FIG. 4B may correspond to the capability information about relaying for direct D2D communication as described with respect to FIG. 4A. Thus, the capability information about relaying for direct D2D communication as described with respect to the method 420 may have the same or similar contents and feature elements as the capability information about relaying for direct D2D communication as described with respect to the method 410.

In accordance with some exemplary embodiments, the second terminal device may receive a response (e.g., a direct communication reject message, etc.) from the first terminal device to reject the connection establishment.

In accordance with some exemplary embodiments, the second terminal device may receive, from the first terminal device, information about which type of relaying (e.g., layer-2 and/or higher layer based relaying, etc.) is supported by the first terminal device.

In accordance with some exemplary embodiments, the second terminal device may receive, from the first terminal device, a confirmation of the target device with respect to the connection establishment. The confirmation may indicate which type of relaying is to be adopted for a path between the source device and the target device.

In accordance with some exemplary embodiments, the second terminal device may enable layer-2 based relaying for the path between the source device and the target device, when the confirmation indicates that the layer-2 based relaying is to be adopted for the path between the source device and the target device.

In accordance with some exemplary embodiments, the layer-2 based relaying may be performed by an adaptation layer entity of the second terminal device. The adaptation layer entity may have one or more adaptation layer functionalities which may be activated according to one or more of the following elements:

an indication of activating an adaptation layer;
a relaying configuration in a multi-hop path;
a request message for establishing a layer-2 relay path;
an accept message for establishing a layer-2 relay path;
a packet which is to be transmitted over an LCH related to a multi-hop path where the layer-2 based relaying is used;
a packet which is to be transmitted over a SLRB related to a multi-hop path where the layer-2 based relaying is used;
an indication of configuring an adaptation layer; and
configuration information including one or more parameters for configuring an adaptation layer.

In accordance with some exemplary embodiments, the second terminal device may transmit a packet including an adaptation layer header to the first terminal device, when adaptation layer functionality based relaying is adopted for the path between the source device and the target device.

In accordance with some exemplary embodiments, the second terminal device may receive a packet including an adaptation layer header from the first terminal device, when adaptation layer functionality based relaying is adopted for the path between the source device and the target device.

In accordance with some exemplary embodiments, the second terminal device may map one or more SLRBs to a sidelink LCH, according to a predetermined criterion (e.g., the predetermined criterion as described with respect to FIG. 4A).

In accordance with some exemplary embodiments, the second terminal device may indicate whether an adaptation layer header is included in a packet transmitted by the second terminal device.

In accordance with some exemplary embodiments, the second terminal device may multiplex packets according to whether an adaptation layer header is included in each of the packets.

In accordance with some exemplary embodiments, the second terminal device may multiplex packets to be transmitted to different layer-2 destinations into a PDU. According to an embodiment, each of the packets may have an associated adaptation layer header. In an embodiment, the different layer-2 destinations may be corresponding to the same device, and the PDU may have a header including information about one of the different layer-2 destinations.

In accordance with some exemplary embodiments, the second terminal device may receive configuration information (e.g., SLRB configuration information, adaptation layer configuration information, etc.) about the relaying for direct D2D communication from a network node.

Figure 4C:
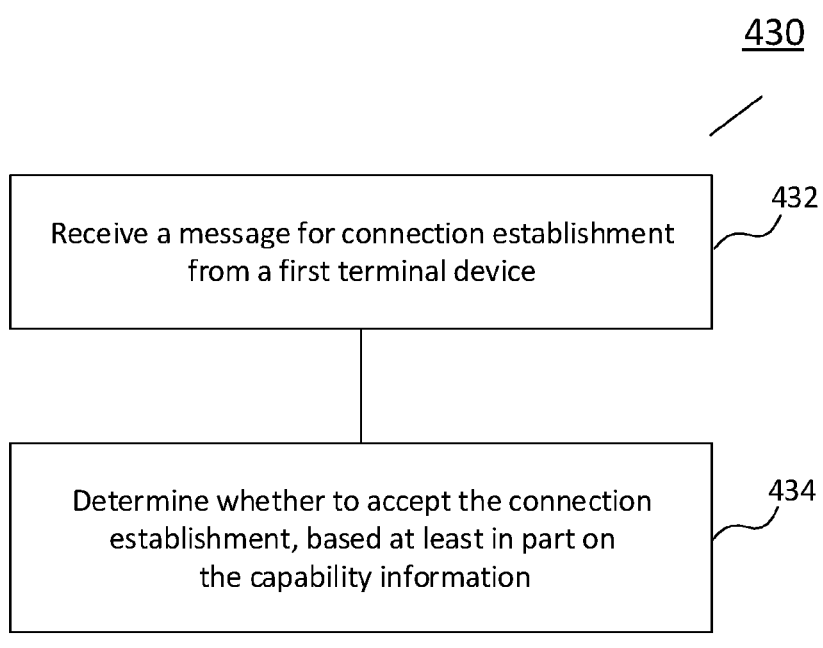

FIG. 4C is a flowchart illustrating a method 430 according to some embodiments of the present disclosure. The method 430 illustrated in FIG. 4C may be performed by a third terminal device (e.g., the target UE shown in FIGS. 3A-3B) or an apparatus communicatively coupled to the third terminal device. In accordance with an exemplary embodiment, the third terminal device may be configured to support direct D2D communication (e.g., V2X or sidelink communication, etc.) with other terminal devices. In an exemplary embodiment, the third terminal device may be configured to communicate with a network node such as a base station. It can be appreciated that the first terminal device as described with respect to FIG. 4A, the second terminal device as described with respect to FIG. 4B and the third terminal device as described with respect to FIG. 4C may be served by the same base station or different base stations.

According to the exemplary method 430 illustrated in FIG. 4C, the third terminal device may receive a message for connection establishment (e.g., the message for connection establishment as described with respect to FIG. 4A) from a first terminal device (e.g., the first terminal device as described with respect to FIG. 4A), as shown in block 432. The first terminal device may be a relay device between a source device and a target device of the connection establishment, and the third terminal device may be the target device of the connection establishment. In an embodiment, the message for connection establishment may include capability information about relaying for direct D2D communication. Based at least in part on the capability information, the third terminal device may determine whether to accept the connection establishment, as shown in block 434.

It can be appreciated that the message for connection establishment as described with respect to FIG. 4C may correspond to the message for connection establishment as described with respect to FIG. 4A. Thus, the message for connection establishment as described with respect to the method 430 may have the same or similar contents and feature elements as the message for connection establishment as described with respect to the method 410.

Similarly, it can be appreciated that the capability information about relaying for direct D2D communication as described with respect to FIG. 4C may correspond to the capability information about relaying for direct D2D communication as described with respect to FIG. 4A. Thus, the capability information about relaying for direct D2D communication as described with respect to the method 430 may have the same or similar contents and feature elements as the capability information about relaying for direct D2D communication as described with respect to the method 410.

In accordance with some exemplary embodiments, the determination of whether to accept the connection establishment based at least in part on the capability information may comprise: determining to accept the connection establishment, when the capability information indicates that the source device and each relay device between the source device and the target device support layer-2 based relaying.

In accordance with some exemplary embodiments, the determination of whether to accept the connection establishment based at least in part on the capability information may comprise: determining to accept the connection establishment, when the capability information indicates that the source device and each relay device between the source device and the target device support another type of relaying different from layer-2 based relaying.

In accordance with some exemplary embodiments, the third terminal device may transmit a confirmation with respect to the connection establishment to the first terminal device. The confirmation may indicate which type of relaying is to be adopted for a path between the source device and the target device.

In accordance with some exemplary embodiments, the third terminal device may inform the first terminal device of whether the third terminal device supports layer-2 based relaying. Alternatively or additionally, the third terminal device may inform the first terminal device of which type of relaying is supported by the third terminal device.

In accordance with some exemplary embodiments, the third terminal device may support or may not support the layer-2 based relaying. In accordance with some exemplary embodiments, when the confirmation indicates that the layer-2 based relaying is to be adopted for the path between the source device and the target device, the third terminal device may enable layer-2 based relaying for the path between the source device and the target device. It can be appreciated that the enablement of the layer-2 based relaying may be independent from whether the third terminal device supports the layer-2 based relaying.

In accordance with some exemplary embodiments, the layer-2 based relaying may be performed by an adaptation layer entity with one or more adaptation layer functionalities. In an exemplary embodiment, the one or more adaptation layer functionalities may be activated for the third terminal device according to one or more elements (e.g., the one or more elements for activating adaptation layer functionalities for the second terminal device as described with respect to FIG. 4B).

In accordance with some exemplary embodiments, the third terminal device may transmit a packet including an adaptation layer header to the first terminal device, when adaptation layer functionality based relaying is adopted for the path between the source device and the target device.

In accordance with some exemplary embodiments, the third terminal device may receive a packet including an adaptation layer header from the first terminal device, when adaptation layer functionality based relaying is adopted for the path between the source device and the target device.

In accordance with some exemplary embodiments, the third terminal device may map one or more SLRBs to a sidelink LCH, according to a predetermined criterion (e.g., the predetermined criterion as described with respect to FIG. 4A).

In accordance with some exemplary embodiments, the third terminal device may indicate whether an adaptation layer header is included in a packet transmitted by the third terminal device.

In accordance with some exemplary embodiments, the third terminal device may multiplex packets according to whether an adaptation layer header is included in each of the packets.

In accordance with some exemplary embodiments, the third terminal device may multiplex packets to be transmitted to different layer-2 destinations into a PDU. In an embodiment, each of the packets may have an associated adaptation layer header. In some cases, the different layer-2 destinations may be corresponding to the same device, and the PDU may have a header including information about one of the different layer-2 destinations.

In accordance with some exemplary embodiments, the third terminal device may receive configuration information (e.g., SLRB configuration information, adaptation layer configuration information, etc.) about the relaying for direct D2D communication from a network node.

It can be appreciated that the first terminal device as described with respect to FIG. 4A may also be configured to perform the method 420 illustrated in FIG. 4B or the method 430 illustrated in FIG. 4C. Similarly, the second terminal device as described with respect to FIG. 4B may also be configured to perform the method 410 illustrated in FIG. 4A or the method 430 illustrated in FIG. 4C, and the third terminal device as described with respect to FIG. 4C may also be configured to perform the method 410 illustrated in FIG. 4A or the method 420 illustrated in FIG. 4B.

Figure 4D:
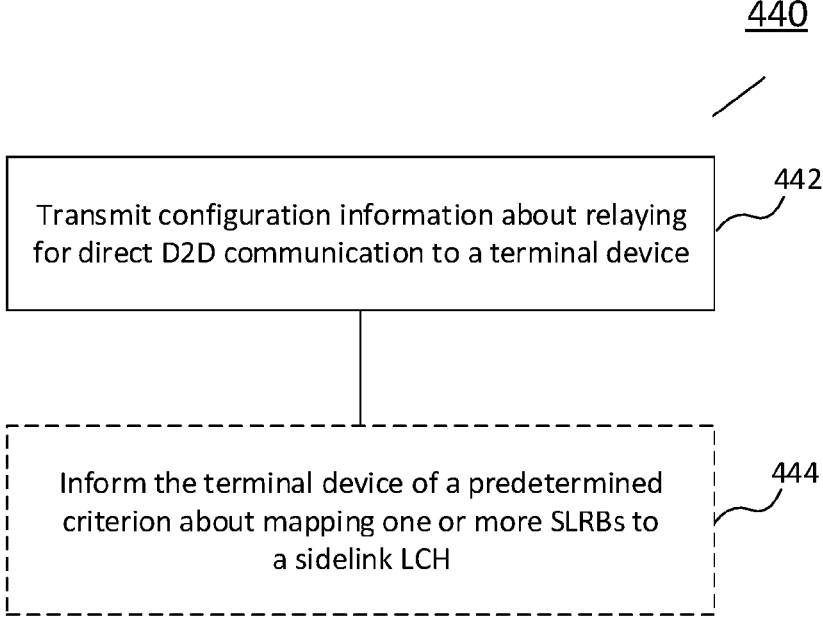

FIG. 4D is a flowchart illustrating a method 440 according to some embodiments of the present disclosure. The method 440 illustrated in FIG. 4D may be performed by a network node or an apparatus communicatively coupled to the network node. In accordance with an exemplary embodiment, the network node such as a base station may be configured to serve one or more terminal devices such as the first terminal device as described with respect to FIG. 4A, the second terminal device as described with respect to FIG. 4B, and/or the third terminal device as described with respect to FIG. 4C.

According to the exemplary method 440 illustrated in FIG. 4D, the network node may transmit configuration information about relaying for direct D2D communication to a terminal device (e.g., the first terminal device as described with respect to FIG. 4A, the second terminal device described with respect to FIG. 4B, the third terminal device described with respect to FIG. 4C, etc.), as shown in block 442. In accordance with some exemplary embodiments, the configuration information may include one or more parameters for configuring an adaptation layer entity and/or other relaying functionality entity of the terminal device.

As mentioned previously, the relaying for direct D2D communication may comprise layer-2 based relaying (e.g., adaptation layer functionality based relaying, etc.), and/or other types of relaying (e.g., layer-1/layer-3/higher layer based relaying, etc.).

In accordance with some exemplary embodiments, the network node may optionally inform the terminal device of a predetermined criterion about mapping one or more SLRBs to a sidelink LCH, as shown in block 444. In an embodiment, the predetermined criterion informed to the terminal device by the network node may correspond to the predetermined criterion for mapping SLRBs to a sidelink LCH as described with respect to FIG. 4A.

Various exemplary embodiments according to the present disclosure propose a mechanism/procedure to convey and exchange information between terminal devices (e.g. V2X capable UEs, etc.) about the support of/preference to layer-2 based relaying (e.g., adaptation layer functionalities, etc.) or other type(s) of relaying, based on which the layer-2 based relaying or other type(s) of relaying may be configured/enabled properly for direct D2D communication. In accordance with some exemplary embodiments, a terminal device may be able to differentiate SRB and DRB with the presence of adaptation layer. In addition, the adaptation layer may be used also in the case of single hop sidelink unicast communication, by which transmissions to different layer-2 destinations belonging to the same physical UE may be multiplexed in the same MAC PDU. Application of various exemplary embodiments can improve resource utilization, extend sidelink coverage and enhance transmission performance for the direct D2D communication.

The various blocks shown in FIGS. 4A-4D may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
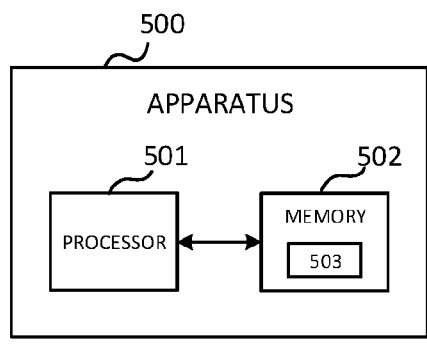
FIG. 5 is a block diagram illustrating an apparatus according to some embodiments of the present disclosure.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In accordance with some exemplary embodiments, the apparatus 500 may be implemented as an integrated circuit chip or module that can be plugged or installed into a first terminal device as described with respect to FIG. 4A, a second terminal device as described with respect to FIG. 4B, a third terminal device as described with respect to FIG. 4C, or a network node as described with respect to FIG. 4D. In such cases, the apparatus 500 may be implemented as a first terminal device as described with respect to FIG. 4A, a second terminal device as described with respect to FIG. 4B, a third terminal device as described with respect to FIG. 4C, or a network node as described with respect to FIG. 4D.

In some implementations, the one or more memories 502 and the computer program codes 503 may be configured to, with the one or more processors 501, cause the apparatus 500 at least to perform any operation of the method as described in connection with FIG. 4A. In other implementations, the one or more memories 502 and the computer program codes 503 may be configured to, with the one or more processors 501, cause the apparatus 500 at least to perform any operation of the method as described in connection with FIG. 4B. In other implementations, the one or more memories 502 and the computer program codes 503 may be configured to, with the one or more processors 501, cause the apparatus 500 at least to perform any operation of the method as described in connection with FIG. 4C. In other implementations, the one or more memories 502 and the computer program codes 503 may be configured to, with the one or more processors 501, cause the apparatus 500 at least to perform any operation of the method as described in connection with FIG. 4D. Alternatively or additionally, the one or more memories 502 and the computer program codes 503 may be configured to, with the one or more processors 501, cause the apparatus 500 at least to perform more or less operations to implement the proposed methods according to the exemplary embodiments of the present disclosure.

Figure 6A:
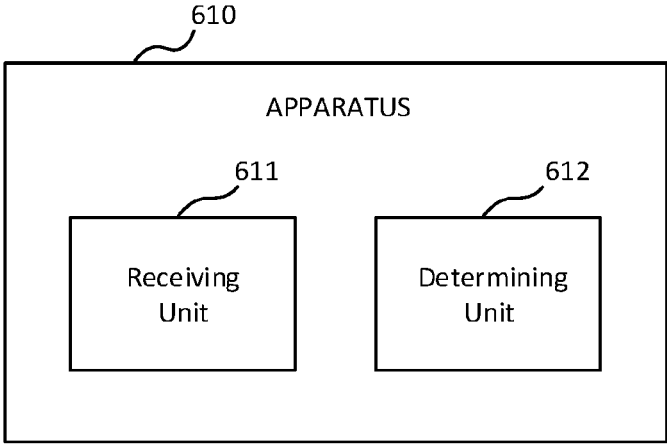
FIGS. 6A-6D are block diagrams illustrating various apparatuses according to some embodiments of the present disclosure.

FIG. 6A is a block diagram illustrating an apparatus 610 according to some embodiments of the present disclosure. As shown in FIG. 6A, the apparatus 610 may comprise a receiving unit 611 and a determining unit 612. In an exemplary embodiment, the apparatus 610 may be implemented in a first terminal device such as a UE. The receiving unit 611 may be operable to carry out the operation in block 412, and the determining unit 612 may be operable to carry out the operation in block 414. Optionally, the receiving unit 611 and/or the determining unit 612 may be operable to carry out more or less operations to implement the proposed methods according to the exemplary embodiments of the present disclosure.

Figure 6B:
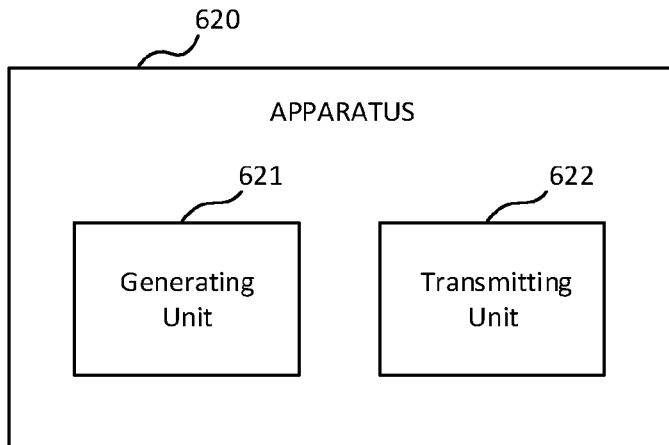

FIG. 6B is a block diagram illustrating an apparatus 620 according to some embodiments of the present disclosure. As shown in FIG. 6B, the apparatus 620 may comprise a generating unit 621 and a transmitting unit 622. In an exemplary embodiment, the apparatus 620 may be implemented in a second terminal device such as a UE. The generating unit 621 may be operable to carry out the operation in block 422, and the transmitting unit 622 may be operable to carry out the operation in block 424. Optionally, the generating unit 621 and/or the transmitting unit 622 may be operable to carry out more or less operations to implement the proposed methods according to the exemplary embodiments of the present disclosure.

Figure 6C:
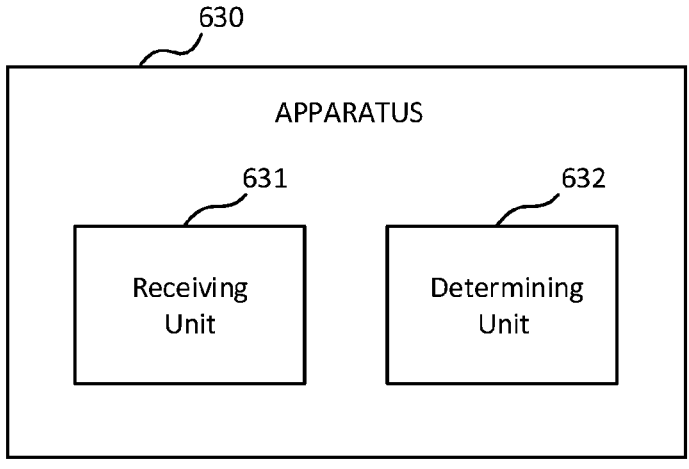

FIG. 6C is a block diagram illustrating an apparatus 630 according to some embodiments of the present disclosure. As shown in FIG. 6C, the apparatus 630 may comprise a receiving unit 631 and a determining unit 632. In an exemplary embodiment, the apparatus 630 may be implemented in a third terminal device such as a UE. The receiving unit 631 may be operable to carry out the operation in block 432, and the determining unit 632 may be operable to carry out the operation in block 434. Optionally, the receiving unit 631 and/or the determining unit 632 may be operable to carry out more or less operations to implement the proposed methods according to the exemplary embodiments of the present disclosure.

Figure 6D:
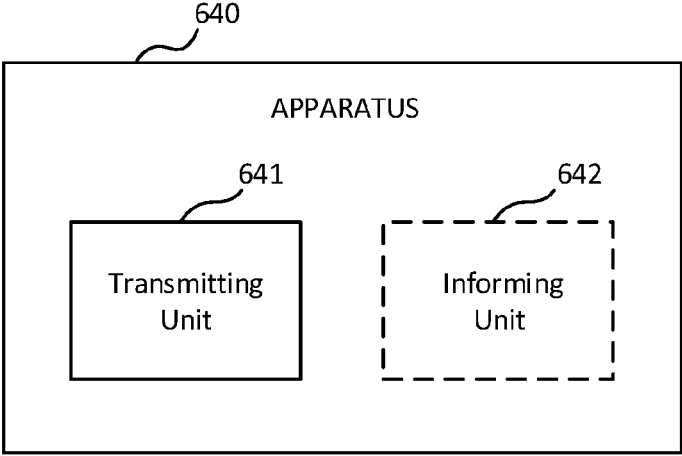

FIG. 6D is a block diagram illustrating an apparatus 640 according to some embodiments of the present disclosure. As shown in FIG. 6D, the apparatus 640 may comprise a transmitting unit 641 and optionally an informing unit 642. In an exemplary embodiment, the apparatus 640 may be implemented in a network node such as a base station. The transmitting unit 641 may be operable to carry out the operation in block 442, and the informing unit 642 may be operable to carry out the operation in block 444. Optionally, the transmitting unit 641 and/or the informing unit 642 may be operable to carry out more or less operations to implement the proposed methods according to the exemplary embodiments of the present disclosure.

Figure 7:
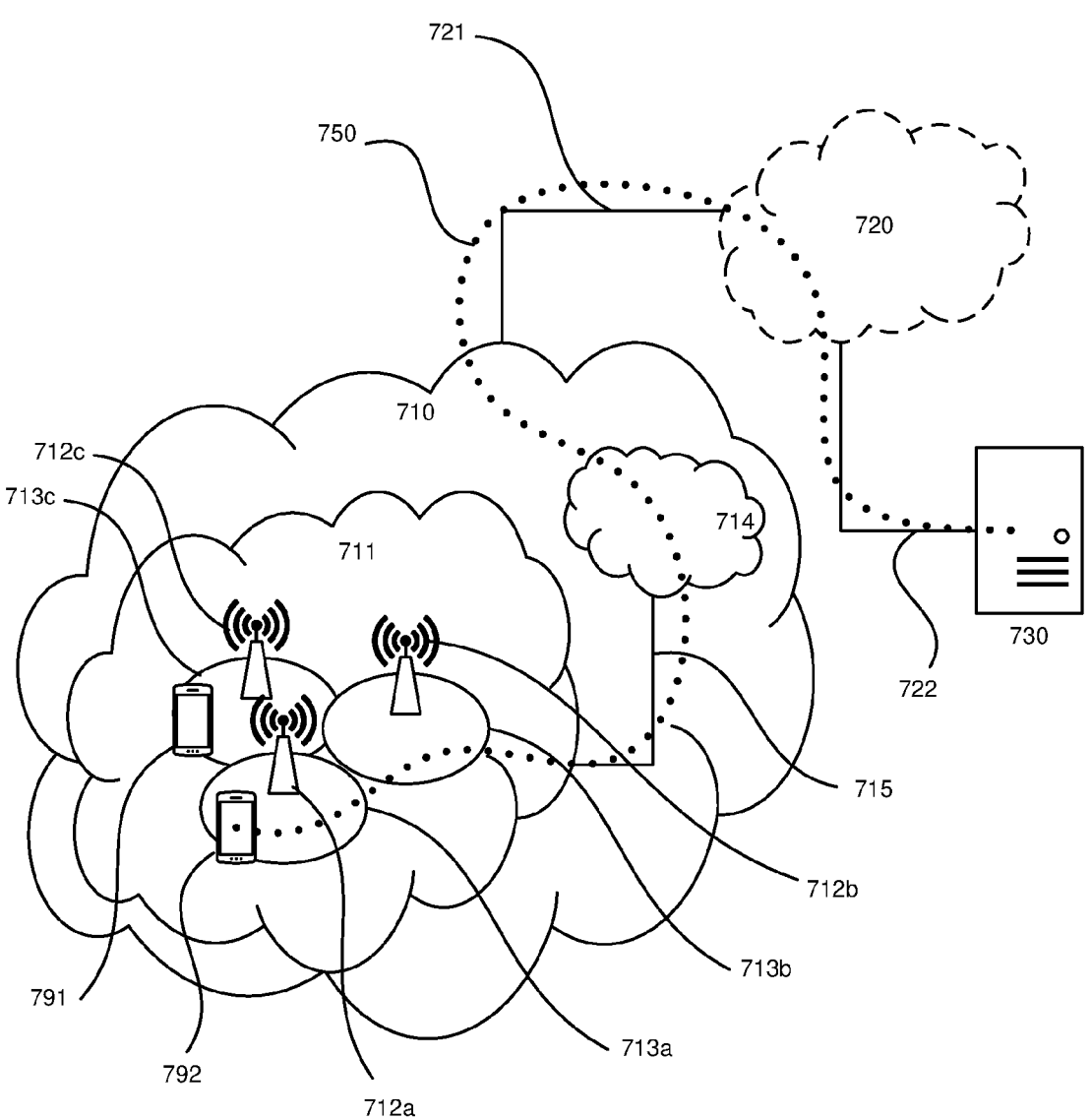
FIG. 7 is a block diagram illustrating a telecommunication network connected via an intermediate network to a host computer in accordance with some embodiments of the present disclosure.

FIG. 7 is a block diagram illustrating a telecommunication network connected via an intermediate network to a host computer in accordance with some embodiments of the present disclosure.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 791 located in a coverage area 713c is configured to wirelessly connect to, or be paged by, the corresponding base station 712c. A second UE 792 in a coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. Connections 721 and 722 between the telecommunication network 710 and the host computer 730 may extend directly from the core network 714 to the host computer 730 or may go via an optional intermediate network 720. An intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, the base station 712 may not or need not be informed about the past routing of an incoming downlink communication with data originating from the host computer 730 to be forwarded (e.g., handed over) to a connected UE 791. Similarly, the base station 712 need not be aware of the future routing of an outgoing uplink communication originating from the UE 791 towards the host computer 730.

Figure 8:
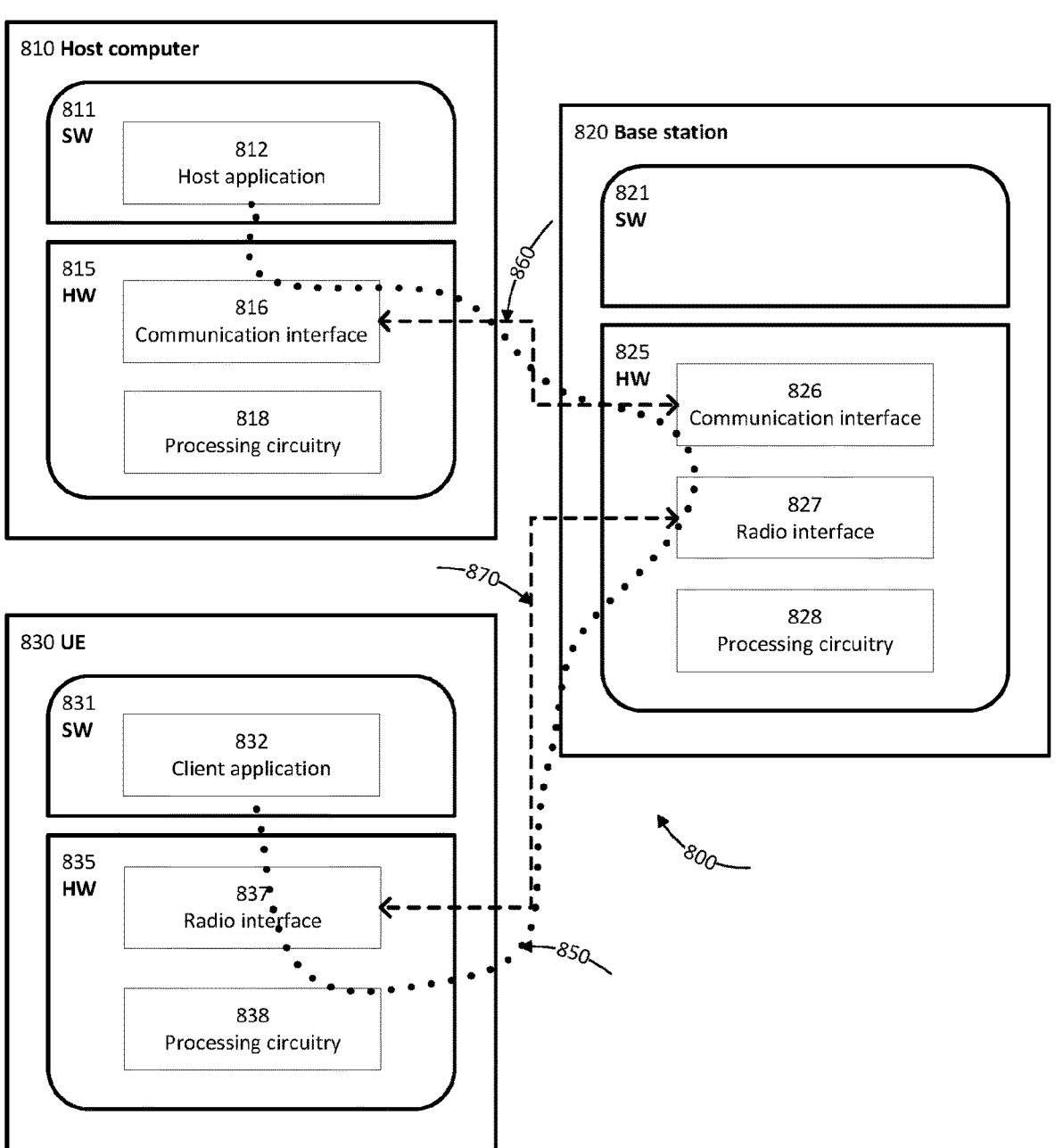
FIG. 8 is a block diagram illustrating a host computer communicating via a base station with a UE over a partially wireless connection in accordance with some embodiments of the present disclosure.

FIG. 8 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises a processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes a processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes a processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, the base station 820 and the UE 830 illustrated in FIG. 8 may be similar or identical to the host computer 730, one of base stations 712*a*, 712*b*, 712*c* and one of UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

Wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection 850 may be implemented in software 811 and hardware 815 of the host computer 810 or in software 831 and hardware 835 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which the software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer 810's measurements of throughput, propagation times, latency and the like. The measurements may be implemented in that the software 811 and 831 causes messages to be transmitted, in particular empty or 'dummy' messages, using the OTT connection 850 while it monitors propagation times, errors etc.

Figure 9:
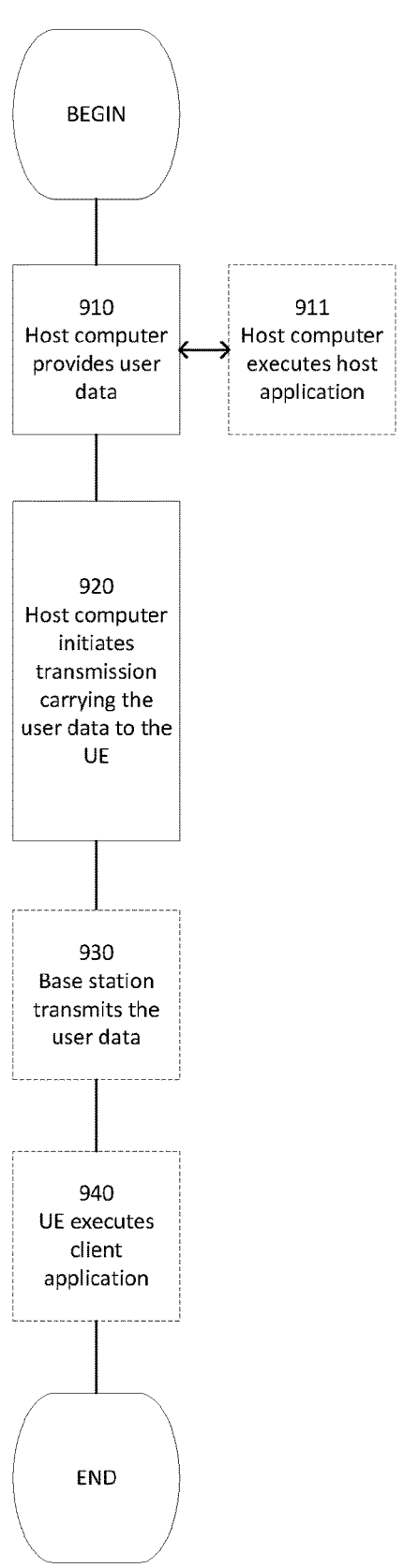
FIG. 9 is a flowchart illustrating a method implemented in a communication system, in accordance with an embodiment of the present disclosure.

FIG. 9 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
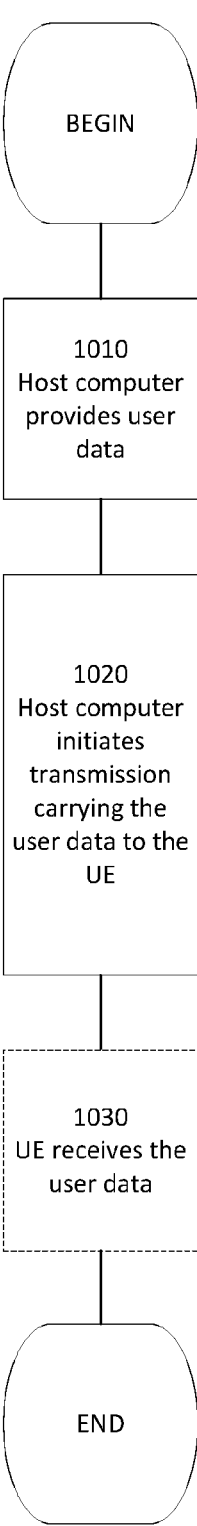
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 10 will be included in this section. In step 1010 of the method, the host computer provides user data. In an optional sub step (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
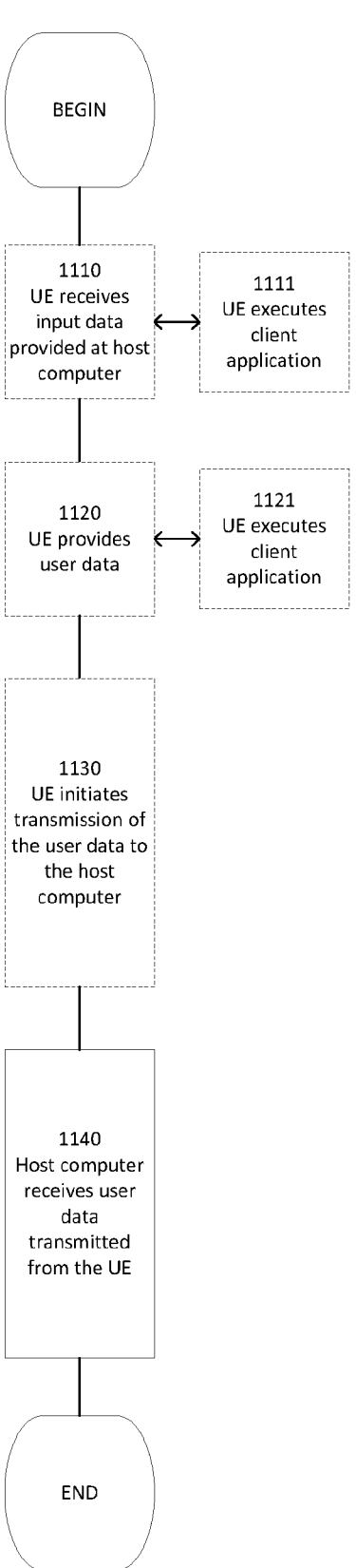
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
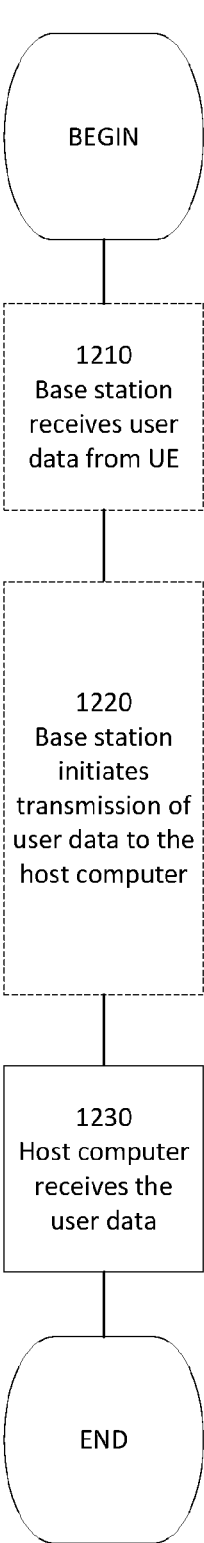
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the exemplary method 440 as describe with respect to FIG. 4D.

According to some exemplary embodiments, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the exemplary method 440 as describe with respect to FIG. 4D.

According to some exemplary embodiments, there is provided a method implemented in a communication system which may include a host computer, a base station and a UE.

The method may comprise providing user data at the host computer. Optionally, the method may comprise, at the host computer, initiating a transmission carrying the user data to the UE via a cellular network comprising the base station. The UE may perform any step of the exemplary method 410 as describe with respect to FIG. 4A, any step of the exemplary method 420 as describe with respect to FIG. 4B, and/or any step of the exemplary method 430 as describe with respect to FIG. 4C.

According to some exemplary embodiments, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the exemplary method 410 as describe with respect to FIG. 4A, any step of the exemplary method 420 as describe with respect to FIG. 4B, and/or any step of the exemplary method 430 as describe with respect to FIG. 4C.

According to some exemplary embodiments, there is provided a method implemented in a communication system which may include a host computer, a base station and a UE. The method may comprise, at the host computer, receiving user data transmitted to the base station from the UE which may perform any step of the exemplary method 410 as describe with respect to FIG. 4A, any step of the exemplary method 420 as describe with respect to FIG. 4B, and/or any step of the exemplary method 430 as describe with respect to FIG. 4C.

According to some exemplary embodiments, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the exemplary method 410 as describe with respect to FIG. 4A, any step of the exemplary method 420 as describe with respect to FIG. 4B, and/or any step of the exemplary method 430 as describe with respect to FIG. 4C.

According to some exemplary embodiments, there is provided a method implemented in a communication system which may include a host computer, a base station and a UE. The method may comprise, at the host computer, receiving, from the base station, user data originating from a transmission which the base station has received from the UE. The base station may perform any step of the exemplary method 440 as describe with respect to FIG. 4D.

According to some exemplary embodiments, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the exemplary method 440 as describe with respect to FIG. 4D.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a first terminal device acting as a relay device in a multi-hop device-to-device (D2D) communication path, comprising:
   receiving a message for connection establishment between a source terminal device and a target terminal device from a second terminal device which is either the source terminal device or a relay device on the path, wherein the message includes capability information about relaying for direct device-to-device communication, wherein the capability information indicates which type of relaying for direct D2D communication is supported by the second terminal device; and
   determining whether to transmit the message to a third terminal device, based at least in part on the capability information, wherein the third terminal device is a next relay device or the target terminal device.

2. The method according to claim 1, wherein the relaying for direct device-to-device communication comprises layer-2 based relaying and/or layer-3 based relaying.

3. The method according to claim 1, wherein when the second terminal device is a source device initiating the connection establishment, the determination of whether to transmit the message to the third terminal device based at least in part on the capability information comprises:
   determining to transmit the message to the third terminal device, when the first terminal device supports layer-2 based relaying, and the capability information indicates that the second terminal device supports the layer-2 based relaying; or
   determining to transmit the message to the third terminal device, when the first terminal device supports another type of relaying different from layer-2 based relaying, and the capability information indicates that the second terminal device supports the another type of relaying; or
   determining not to transmit the message to the third terminal device, when layer-2 based relaying is not supported by the first terminal device, and the capability information indicates that the second terminal device only supports the layer-2 based relaying.

4. The method according to claim 1, wherein when the second terminal device is a relay device between the source device and the first terminal device, the determination of whether to transmit the message to the third terminal device based at least in part on the capability information comprises at least one of:
   when the second terminal device is the source terminal device:
      determining to transmit the message to the third terminal device if the first terminal device supports a given type of relaying and the capability information indicates that the source terminal device also supports that type of relaying;
      determining not to transmit the message to the third terminal device if the first terminal device does not support layer-2 based relaying and the capability information indicates that the source terminal device supports only layer-2 based relaying;
   when the second terminal device is a relay device between the source and the first terminal device:
      determining to transmit the message to the third terminal device if the first terminal device and each preceding relay device in the path support a common relaying type as indicated in the capability information.

5. The method according to claim 1, further comprising:
   transmitting the message for connection establishment to the third terminal device, when determining to transmit the message to the third terminal device; and
   receiving, from the third terminal device, a confirmation of a target device with respect to the connection establishment, wherein the confirmation indicates which type of relaying is to be adopted for a path between the source device and the target device.

6. The method according to claim 5, further comprising:
   enabling the layer-2 based relaying for the path between the source device and the target device, when the confirmation indicates that the layer-2 based relaying is to be adopted for the path between the source device and the target device.

7. The method according to claim 6, wherein when adaptation layer functionality based relaying is adopted for the path between the source device and the target device, the method further comprises:

transmitting a packet including an adaptation layer header to at least one of the second terminal device and the third terminal device; and/or receiving a packet including an adaptation layer header from at least one of the second terminal device and the third terminal device.

8. The method according to claim 6, further comprising:

mapping one or more sidelink radio bearers to a sidelink logical channel, according to a predetermined criterion, wherein the predetermined criterion comprises at least one of:

mapping a sidelink radio bearer (SLRB) to a sidelink logical channel (LCH) according to a type of the SLRB;

reserving one or more SLRB IDs for sidelink control signaling;

transmitting a traffic in a type of sidelink LCH according to which type of sidelink LCH on which the traffic is received;

transmitting a traffic to the SLRB according to on which type of SLRB the traffic is received; and indicating a type of the SLRB.

9. The method according to claim 6, further comprising:

indicating whether an adaptation layer header is included in a packet transmitted by the first terminal device.

10. The method according to claim 6, further comprising:

multiplexing packets to be transmitted to different layer-2 destinations into one protocol data unit, wherein each of the packets has an associated adaptation layer header.

11. A method performed by a second terminal device acting as a source terminal device initiating a device to device (D2D) communication session with a target terminal device, comprising:

generating a message for connection establishment for a sidelink communication path to the target terminal device, wherein the message includes capability information about relaying for direct device-to-device communication, wherein the capability information indicates which type of relaying for direct D2D communication is supported by the second terminal device; and transmitting the message for connection establishment to a first terminal device which is a relay device between the source device and a target device of the connection establishment.

12. The method according to claim 11, wherein the relaying for direct device-to-device communication comprises layer-2 based relaying and/or layer-3 based relaying.

13. The method according to claim 11, further comprising:

receiving, from the first terminal device, a confirmation of the target device with respect to the connection establishment, wherein the confirmation indicates which type of relaying is to be adopted for a path between the source device and the target device.

14. The method according to claim 13, further comprising:

enabling layer-2 based relaying for the path between the source device and the target device, when the confirmation indicates that the layer-2 based relaying is to be adopted for the path between the source device and the target device.

15. The method according to claim 14, further comprising:

mapping one or more sidelink radio bearers to a sidelink logical channel, according to a predetermined criterion.

16. The method according to claim 14, further comprising:

multiplexing packets to be transmitted to different layer-2 destinations into one protocol data unit, wherein each of the packets has an associated adaptation layer header.

17. A method performed by a third terminal device acting as a target terminal device of a device to device (D2D) communication path, comprising:

receiving a message for connection establishment from a first terminal device which is a relay device between a source device and a target device of the connection establishment, wherein the message includes capability information about relaying for direct device-to-device communication, wherein the capability information indicates which type of relaying for direct D2D communication is supported by the second terminal device; and determining whether to accept the connection establishment, based at least in part on the capability information.

18. The method according to claim 17, wherein when the capability information indicates that the source device and each relay device between the source device and the target device support layer-2 based relaying, or support another type of relaying different from the layer-2 based relaying, the determination of whether to accept the connection establishment based at least in part on the capability information comprises:

determining to accept the connection establishment.

19. The method according to claim 17, further comprising:

mapping one or more sidelink radio bearers to a sidelink logical channel, according to a predetermined criterion.

20. The method according to claim 17, further comprising:

multiplexing packets to be transmitted to different layer-2 destinations into one protocol data unit, wherein each of the packets has an associated adaptation layer header.

* * * * *